United States Patent
Cartagena Fagerström et al.

(10) Patent No.: US 12,435,389 B2
(45) Date of Patent: Oct. 7, 2025

(54) SYSTEM AND PROCESS FOR PROGRESSIVE REFRACTORY ORE TRANSFORMATION FOR COPPER LEACHING

(71) Applicant: Ceibo Inc., Santiago (CL)

(72) Inventors: Alejandro Horacio Cartagena Fagerström, Santiago (CL); Catalina Urrejola Santa Maria, Santiago (CL); Nicole Stephanie Guajardo Contreras, Región Metropolitana de Santiago (CL); Anselmo Enrique Román Espinoza, Región Metropolitana de Santiago (CL); Fernando Matías Bórquez Martínez, Región Metropolitana de Santiago (CL)

(73) Assignee: Ceibo Inc., Santiago (CL)

( * ) Notice: Subject to any disclaimer, the term of this patent is extended or adjusted under 35 U.S.C. 154(b) by 0 days.

(21) Appl. No.: 19/114,304

(22) PCT Filed: Jun. 12, 2024

(86) PCT No.: PCT/US2024/033545
§ 371 (c)(1),
(2) Date: Mar. 21, 2025

(87) PCT Pub. No.: WO2024/258924
PCT Pub. Date: Dec. 19, 2024

(65) Prior Publication Data
US 2025/0263811 A1    Aug. 21, 2025

Related U.S. Application Data

(60) Provisional application No. 63/521,010, filed on Jun. 14, 2023.

(51) Int. Cl.
*C25C 1/00*    (2006.01)
*C22B 3/08*    (2006.01)
(Continued)

(52) U.S. Cl.
CPC ............ *C22B 15/0071* (2013.01); *C22B 3/08* (2013.01); *C25C 1/12* (2013.01)

(58) Field of Classification Search
CPC .......... C25C 1/12; C22B 3/08; C22B 15/0071
See application file for complete search history.

(56) References Cited

U.S. PATENT DOCUMENTS 5,250,272 A    10/1993    Knorre et al.
6,319,389 B1    11/2001    Fountain et al.
(Continued)

FOREIGN PATENT DOCUMENTS

CL    2015003082 A1    6/2016
CL    202202482 A1    1/2023
(Continued)

OTHER PUBLICATIONS

Ji, G., Liao, Y., Wu, Y., Xi, J., & Liu, Q. (2022). A review on the research of hydrometallurgical leaching of low-grade complex chalcopyrite. Journal of Sustainable Metallurgy, 8(3), 964-977.
(Continued)

*Primary Examiner* — Zulmariam Mendez
(74) *Attorney, Agent, or Firm* — PEARL COHEN ZEDEK LATZER BARATZ LLP

(57) ABSTRACT

A hydrometallurgical process for processing metal ore includes a dynamic oxidative step in which the ore is irrigated with specific reactive liquid mixtures at low flow rates to progressively transform the ore and maintain conditions for enhanced recovery of metal from the ore by solvent-extraction/electrowinning. In embodiments, the systems and methods described herein may be used for obtaining copper metal from the refractory copper mineral chalcopyrite. A copper heap subjected to the electrochemical regimes established and maintained in the heap using these methods exhibit novel kinetics.

30 Claims, 6 Drawing Sheets

(51) Int. Cl.
    C22B 15/00    (2006.01)
    C25C 1/12     (2006.01)

(56) References Cited

U.S. PATENT DOCUMENTS

| | | |
|---|---|---|
| 8,871,003 B2 | 10/2014 | Rorke |
| 9,683,277 B2 | 6/2017 | Fagerstrom et al. |
| 9,816,155 B2 | 11/2017 | Martinez et al. |
| 10,041,143 B2 | 8/2018 | Rautenbach |
| 2009/0241736 A1 | 10/2009 | Abe et al. |
| 2015/0082943 A1 | 3/2015 | Cartagena Fagerström et al. |
| 2016/0258036 A1 | 9/2016 | Rautenbach |
| 2019/0127822 A1* | 5/2019 | Hackl ................ C22B 1/14 |
| 2021/0207245 A1 | 7/2021 | Ormeno et al. |
| 2023/0086259 A1 | 3/2023 | Lyons |

FOREIGN PATENT DOCUMENTS

| | | |
|---|---|---|
| WO | WO 2021/186374 A1 | 9/2021 |
| WO | WO 2024/057216 A1 | 3/2024 |

OTHER PUBLICATIONS

Sokić, M. D., Marković, B., & Živković, D. (2009). Kinetics of chalcopyrite leaching by sodium nitrate in sulphuric acid. Hydrometallurgy, 95(3-4), 273-279.

Corvo, F.; Reyes, J.; Pérez, T.; Castañeda, A. (2010) Role of NOx in materials corrosion and degradation. Revista CENIC. Ciencias Químicas, vol. 41, , pp. 1-10 Centro Nacional de Investigaciones Científicas La Habana, Cuba.

Baldwin, S. A., & Van Weert, G. (1996). On the catalysis of ferrous sulphate oxidation in autoclaves by nitrates and nitrites. Hydrometallurgy, 42(2), 209-219.

Sokić, M., Marković, B., Stanković, S., Kamberović, Ž. Štrbac, N., Manojlović, V., & Petronijević, N. (2019). Kinetics of chalcopyrite leaching by hydrogen peroxide in sulfuric acid. Metals, 9(11), 1173.

Chaiko, D., Baczek, F., Rocks, S. S., Walters, T., & Klepper, R. (2015). The FLSmidth® rapid-oxidative leach (ROL) process Part I: Mechanochemical process for treating chalcopyrite. In Proceeding of the COM2015, Conference of Metallurgists, Montreal, QC, Canada. Chaiko, David & Baczek, Frank & Rocks, Sara & Walters, T. & Asihene, Samuel Nyampong & Eyzaguirre, Carlos & Klepper, R. & McMahon, Greg. (2015). The FLS Rapid Oxidative Leach (ROL) Process. Part II: A New Chemical Activation Process for Chalcopyrite.

Nicol, M., Miki, H., & Basson, P. (2013). The effects of sulphate ions and temperature on the leaching of pyrite. 2. Dissolution rates. Hydrometallurgy, 133, 182-187.

Schaming, J. (2011). An investigation of leaching chalcopyrite ore (Doctoral dissertation, Queen's University).

Córdoba E.M., Muñoz J.A., Blázquez M.L., González F., Ballester (May 2, 2008). Leaching of chalcopyrite with ferric ion. Part I: General aspects. Hydrometallurgy, 81-87.

Hernandez, et al. "Accelerating Copper Leaching from Sulfide Ores in Acid-Nitrate-Chloride Media Using Agglomeration and Curing as Pretreatment", https://www.mdpi.com/journal/minerals, Apr. 25, 2019.

Search Report for Application No. PCT/US2024/033545, dated Sep. 3, 2024.

Written Opinion for Application No. PCT/US2024/033545, dated Sep. 3, 2024.

* cited by examiner

SYSTEM AND PROCESS FOR PROGRESSIVE REFRACTORY ORE TRANSFORMATION FOR COPPER LEACHING

RELATED APPLICATION DATA

This application claims the benefit of U.S. Provisional Application No. 63/521,010 filed Jun. 14, 2023, entitled "DYNAMIC OXIDATIVE PROCESS", which is incorporated herein by reference.

FIELD OF THE INVENTION

The present invention relates to a hydrometallurgical process and system for heap leaching of metal ores. In embodiments, the process and system of the invention relate to a dynamic oxidative process in connection with leaching copper ore.

BACKGROUND OF THE INVENTION

Leaching, followed by solvent-extraction and electrowinning, is the primary hydrometallurgical process for recovering desired metals from metal-containing ores. The process entails crushing the ore to a uniform particle size, agglomerating the crushed ore with a solution containing acid and/or raffinate, and subsequently stacking the agglomerated ore on large leach pads where the ore is subjected to leaching. Conventional copper leaching was primarily developed for the extraction of copper from oxide ores and certain sulfide ores composed of a mixture of secondary sulfides and oxides ores. The dissolution of copper from such sources is readily initiated by the application of acid or raffinate. The leaching kinetics in acid leaching conditions for copper oxides is characterized by a rapid upslope initiation period followed by a progressive incremental recovery until the rate eventually reaches a static period of copper recovery.

However, most copper oxide ore deposits have now been depleted and there has been a concurrent increase in the discovery of low-grade copper deposits, primarily of chalcopyrite (Cpy). Cpy is one of the most abundant copper ores worldwide, accounting for about 70% of the world's total copper reserves, but it is a refractory mineral that is highly stable in acid systems, resulting in slow dissolution rates and low levels of copper extraction by hydrometallurgical processes. Thus, Cpy at present is typically processed using pyrometallurgical techniques to extract copper from its concentrates. The process requires large inputs of water and energy. In recent decades, new projects for building concentrators have been challenged due to negative environmental impact and high capital requirements. There continues to be a need for effective leaching systems and processes for hydrometallurgical recovery of metal from metal ores, including copper ores containing Cpy.

Various operational processes have been proposed to tackle the refractory behavior of Cpy and to improve copper extraction kinetics, including the use of complex oxidative aqueous solutions. See, e.g., Ji, et. al., *Jrnl. Sustainable Metallurgy* (2022) 8:964-977. These proposals include use of leaching solutions containing oxidizing agents such as oxygen, chloride, ferric, cupric, and nitrate ions, bacteria, and others to increase the oxidation-reduction potential (ORP) in the heap. Nevertheless, the prior art has been unable to offer alternatives which lend themselves to successful application at industrial scale.

The use of nitrate ion in different leaching systems for copper sulfide is described experimentally in Sokić, et al., *Hydrometallurgy* 95, 273-279 (2009) which studied the use of sodium nitrate as an oxidizer for copper concentrates in the presence of sulfuric acid. However, the ore particle size in the study was small, approximately 37 microns, which is impractical to be applied in heap leaching. Moreover, it was required to maintain an elevated temperature of the leaching system throughout and the chemical reactions described would likely generate high levels of NOx emissions at industrial scale.

Hernandez, et al., *Minerals* 9, 250 (2019) described the use of pre-treatment with acid-nitrate-chloride mixture in the chloride leaching of Cpy using mini columns. The "pre-treatment" contemplated in this publication, which is conducted in a laboratory setting, relates to agglomeration and curing, rather than any process conducted after the ore has been allowed to stand prior to leaching.

U.S. Pat. No. 9,683,277, which is incorporated by reference for its teaching related to nitrate leaching and agglomeration, describes a process for preparing a ferric nitrate reagent from copper raffinate solution and use of such reagent in the leaching and/or curing of copper substances, including copper sulfide ores. The ferric nitrate reagent has high redox potential, which may make it suitable for leaching copper sulfide ores and the solution may be regenerated from the solvent extraction raffinate.

Sokić, et al., *Metals* 9, 1173 (2019) teach that ferric solutions have been used as oxidants in copper sulfide ore leaching. Some reports have demonstrated that an increase in ferric ions in solution correlates with better dissolution of Cpy due to an increase in the redox potential, allowing for dissolution of the metal of interest into the aqueous phase during heap leaching. Sokić, et al., further report that hydrogen peroxide ($H_2O_2$) is a strong oxidant that can be used to increase the leaching ratio for Cpy in a sulfuric acid medium. However, hydrogen peroxide is unstable and rapidly decomposes in the leaching process. It therefore would be necessary to add large quantities of peroxide, or use other chemical aids, to achieve adequate copper extraction.

WO 2021/186374 proposes a method of leaching copper using nitrate or nitrite in combination with chloride ion in an agglomeration step to create an oxidative environment prior to the leach step. The method may be capable of achieving high recovery of copper ions from sulfide ores using elevated concentrations of nitrate (5-20 kg/ton of ore) and chloride ions (1-100 kg/ton of ore), associated with harmful and uncontrolled gas emissions at the agglomeration step. Furthermore, the concentration of chloride ions described in the method is associated to infrastructure corrosion.

WO 2024/057216 teaches a method of extracting copper from sulfide mineral ore which involves oxidizing the heap with a solution containing nitrate and nitrite ions and reacting nitric oxide gas produced in the oxidation process. The method primarily protects the treatment of NOx gases expelled from the heap based on the amount of nitrate salts used during the leaching process. Additionally, the method encompasses heap air injection and covering of the heap with a thermofilm for recovery of NOx emissions.

WO 2017/063099 describes a method for the extraction of copper from copper ores employing a reactive mixture containing ammonium nitrate salts ($NH_4NO_3$) and iron ions with a redox potential between 800 and 1200 mV. Additionally, this method eliminates the necessity for the concentration of ferrous ions ($Fe^{2+}$) and the conversion of ferrous ($Fe^{2+}$) to ferric ions ($Fe^{3+}$) in membrane cells.

Conventional leaching kinetic curves can be readily adjusted using exponential kinetic models. See, e.g., Mellado & Cisternas, *Comput. Chem. Eng.* (2008) 32:2395-2402. The dynamic oxidative processes and systems of the present invention exhibit novel kinetics—a departure from the conventional kinetics of copper leaching processes described by such models.

SUMMARY OF THE INVENTION

In view of the state of the art, there is a need for methods and systems for leaching ores, especially copper sulfide ores, to improve metal recovery, process efficiency and environmental impact.

Some embodiments of the invention provide a method for recovering copper from copper ore, comprising: providing a heap of copper ore; performing a heap irrigation with a reactive liquid mixture comprising sulfuric acid and nitrate ion to reach a state of dynamic moisture in the heap; and subjecting the heap to leaching at a flow rate greater than a flow rate of said first heap irrigation to obtain a pregnant liquor solution (PLS).

In some embodiments, the reactive liquid mixture may comprise, e.g., sulfuric acid, nitrate anion and aqueous ferrous sulfate, aqueous ferric sulfate, or a mixture thereof, and may be provided to the heap at a rate of less than 5 $L/h \cdot m^2$, and in some embodiments, at a rate of about 1-3 $L/h \cdot m^2$.

Some embodiments may comprise combining at least a portion of a raffinate solution with the reactive mixture and performing a further irrigation of said heap, e.g., using the combination, subsequent to the first irrigation, and collecting oxidizing solution from the heap after the further irrigation.

In another aspect of the invention, a method for obtaining copper from copper ore using dynamic oxidation may comprise (a) providing a heap of copper ore; (b) performing a first heap irrigation with a first reactive mixture to reach a state of dynamic moisture in the heap; (c) performing a second heap irrigation with a second reactive mixture; (d) draining solution resulting from the second heap irrigation into a copper-rich oxidizing pregnant liquor solution (PLS) collection pond; (e) performing a third heap irrigation with a third mixture comprising said PLS solution; and (f) advancing copper rich solution from said third heap irrigation to a copper recovery stage. In some embodiments, the reactive mixture may comprise sulfuric acid and nitrate anion, supplemented with other process streams from the leaching process and other oxidative reagents.

In some embodiments, a system for recovery of a copper from copper ore, may comprise: (a) a heap of copper ore consisting essentially of crushed copper ore particles; (b) a solvent extraction (SX) loop having, as input, pregnant liquor solution (PLS) from said heap obtained after a period of acid leaching; and, as outputs, raffinate and a copper-enriched product stream; (c) a system of one or more ponds having, as inputs, at least sulfuric acid, nitrate ion and water, and as output, an oxidizing reactive mixture; and (d) at least one conduit delivering said oxidizing reactive mixture to said heap at a first flow rate and reagent concentration different from a flow rate and concentration during said period of acid leaching.

A system for copper ore transformation comprises: an ore crusher, one or more agglomeration device(s), a heap of copper ore and a solids conveyor (such as a belt) adapted to transport ore from the crusher to the agglomeration device and from the agglomeration device to a heap. The system further comprises an SX loop adapted to receive PLS from a PLS pond and recycle spent raffinate. A process island includes separate supply ponds containing, respectively, agglomerating solution, reactive liquid mixture(s), and leaching solution to the heap. Separate ponds are provided in suitable fluid connection with the heap for containing Oxidative Solution and PLS withdrawn from the heap, which may be forwarded to the SX loop or recycled to the process island. Suitable inert conduits may be adapted to convey reactive liquid from the supply ponds to the agglomeration drum and the heap at different times. The process island further has conduits, to provide water and solutions to any of the supply ponds. Further structural elements are shown in, or may be inferred from, FIG. 1 and FIG. 2 in light of the following description.

In one aspect, the invention may be embodied as a method for recovering copper from copper ore, comprising: activating crushed copper ore with an agglomerating solution comprising nitrate ions, sulfuric acid, ferric ions and ferrous ions and an oxidizing agent; forming a heap of the activated copper ore and allowing the heap to rest; irrigating the heap after resting at a flow rate of 0.5-5 $L/h \cdot m^2$ with a first reactive liquid mixture comprising nitrate ions, sulfuric acid, an oxidizing agent and at least one of ferrous and ferric ions; subsequent to irrigating with the first reactive liquid mixture, irrigating the heap at a flow rate of 0.5-5 $L/h \cdot m^2$ with a second reactive liquid mixture comprising sulfuric acid, nitrate ion, at least one of ferrous and ferric ions, an oxidizing agent and a copper-containing solution, until a molar ratio of dissolved copper to chalcopyrite in the heap in a range of 0.3:1 to 0.6:1 is reached; and subjecting the heap to leaching with a leaching solution at a rate greater than 5 $L/h \cdot m^2$ to obtain a copper-rich pregnant liquor solution (PLS).

In embodiments, the method is applied to copper ore containing primarily copper sulfide species. In embodiments, the ore contains primarily chalcopyrite.

The oxidizing agent in the agglomerating solution and in the first and second reactive liquid mixtures may be selected from the group consisting of aqueous hydrogen peroxide, gaseous ozone in micro and nano bubbles, gaseous oxygen in micro and nano bubbles, and air in micro and nano bubbles, and mixtures thereof.

The agglomerating solution used in activating the crushed copper ore may comprise: nitrate ion at a concentration in a range of 0.4 M to 3.2 M; sulfuric acid at a concentration in a range of 0.2 M to 3 M; at least one of ferric ions and ferrous ions at a total concentration in a range of 0.03 M to 0.18 M and hydrogen peroxide at a concentration in a range of 0.02 to 0.06 M; and wherein an oxidation-reduction potential (ORP) of the agglomerating solution is higher than 770 mV vs. Standard Hydrogen Electrode (SHE). Hydrogen peroxide is added for ORP adjustment of the reactive liquid mixture.

After activating, the crushed copper ore may have a moisture content in a range of 3 to 12 percent by weight, may be formed into a heap in that state, and may be allowed to rest without irrigation for 5 to 15 days.

The irrigation with the first reactive liquid mixture may be conducted at a flow rate of 0.5-5 $L/h \cdot m^2$ until a molar ratio of dissolved copper to chalcopyrite in the heap is reached between 0.1:1 to 0.3:1.

In embodiments, the first reactive liquid mixture comprises nitrate ion at a concentration in a range of 0.02 M to 0.4 M, sulfuric acid at a concentration in a range of 0.05 M to 1 M, at least one of ferrous and ferric ions at a combined concentration in a range of 0.02 M to 0.3 M, hydrogen peroxide at a concentration in a range of 0.03 M to 0.3 M;

and a dissolved copper concentration less than 2 mM. Hydrogen peroxide is added for ORP adjustment of the reactive liquid mixture.

In embodiments, the second reactive liquid mixture comprises nitrate ion at a concentration in a range of 0.02 M to 0.4 M, sulfuric acid at a concentration in a range of 0.05 M to 1.00 M, at least one of ferrous and ferric ions at a total concentration of 0.02 M to 0.3 M, hydrogen peroxide in a range of 0.03 M to 0.3 M; and copper ions in a concentration of 2 mM to 100 mM. Hydrogen peroxide is added for ORP adjustment of the reactive liquid mixture.

In embodiments, the copper-containing solution comprises an aqueous stream obtained from the bottom of the heap after irrigation with the first reactive liquid mixture. The copper-containing solution further comprises an aqueous stream obtained from the bottom of the heap after said irrigation with said second reactive liquid mixture. In embodiments, the copper-containing solution in the second reactive liquid mixture is treated with an oxidizing gas in a pressurized reactor prior to the first irrigation to obtain a copper containing solution with an ORP higher than 770 mV vs NHE.

In embodiments, the leaching solution comprises nitrate ion at a concentration in a range of 1 mM to 160 mM, sulfuric acid at a concentration in a range of 0.05 M to 1 M, and ferric and/or ferrous ions at a total concentration in a range of 1 mM to 180 mM.

In embodiments, the leaching solution further comprises hydrogen peroxide at a concentration in a range of 0.01-0.3 M. Hydrogen peroxide is added for ORP adjustment.

In embodiments, the leaching solution further comprises copper ions.

The PLS may be subjected to solvent-extraction and further electrowinning, and the leaching solution may further comprise raffinate from the solvent extraction.

In embodiments, the leaching step is conducted at an irrigation rate of 5-12 L/h·m².

In embodiments, after forming the heap and prior to irrigating the heap with the first reactive liquid mixture, the heap is allowed to rest between 5 to 15 days, followed by irrigating the heap with a third reactive liquid mixture comprising nitrate ion, sulfuric acid, at least one of ferrous and ferric ions, and an oxidizing agent.

The oxidizing agent in the third reactive liquid mixture may be selected from the group consisting of aqueous hydrogen peroxide, gaseous ozone in micro and nano bubbles, gaseous oxygen in micro and nano bubbles and air in micro and nano bubbles, and a mixture thereof.

Irrigating the heap with the third reactive liquid mixture may be conducted at an irrigation rate of 0.5-5 L/h·m² until reaching a volume ratio of about 0.05-0.15 m³ of said third reactive liquid mixture per ton of the copper ore.

In the third reactive liquid mixture, the concentration of nitrate ion may be in a range of 0.4 M to 3.2 M, the concentration of sulfuric acid may be in a range of 0.2 M to 3 M, the concentration of ferric ions may be in a range of 0.03 M to 0.18 M and the concentration of hydrogen peroxide may be 3 mM to 150 mM.

In embodiments, the PLS is subjected to solvent extraction to obtain a copper-rich electrolyte stream and the rich electrolyte stream is subjected to electrowinning to obtain copper cathodes.

PLS may be subjected to solvent extraction and further electrowinning process, and at least one of the agglomerating solution, the first reactive liquid mixture, the second reactive liquid mixture, the third reactive liquid mixture, and the leaching solution further comprises raffinate from the SX process.

The agglomerating solution, the first reactive liquid mixture, the second reactive liquid mixture and the third reactive liquid mixture each may have a redox potential higher than 770 mV (vs SHE).

The heap is maintained at a temperature in a range of about 30-45° C.

In embodiments, the heap is rinsed after leaching to recover residual leaching solution.

A system for recovery of copper from copper ore according to embodiments of the invention may comprise: an ore crusher; one or more agglomeration device(s); a heap of copper ore and at least one solids conveyor adapted to transport ore from the crusher to the agglomeration device(s) and from the agglomeration device(s) to the heap; a solvent extraction loop adapted to receive PLS from a PLS pond and recycle spent raffinate; an electrowinning process to produce product copper cathodes, a process island including separate supplies containing, respectively, agglomerating solution, first reactive liquid mixture, second reactive liquid mixture, third reactive liquid mixture, and leaching solution to the heap; piping adapted to provide fluid communication between each of the separate supplies to the heap; an impermeable pad at the base of the heap from which copper-containing solution is withdrawn; and a plurality of separate ponds provided in fluid communication with the heap for containing copper-containing solution withdrawn from the heap.

In embodiments, an agglomeration device has at least one inlet for the agglomerating solution, whereby the crushed copper ore particles provided from said crusher are activated with the agglomerating solution prior to providing the crushed particles to the heap.

The system may comprise one or more tanks having one or more inlet conduits to provide one or more of: a water, acid, nitrate anion, a portion of the raffinate solution from the solvent extraction process, and at least one reagent chosen from: aqueous ferrous sulfate, aqueous ferric sulfate, aqueous hydrogen peroxide and gaseous ozone, gaseous oxygen and air in micro and nano bubbles, and a mixture thereof.

The leaching solution supply may comprise at least a mixer tank and a dispenser tank in fluid communication with each other adapted to formulate leaching solution.

The leaching solution supply may further comprise a plurality of inlet conduits to provide water, nitrate source, a portion of raffinate solution, and reagent chosen from aqueous ferrous sulfate and aqueous ferric sulfate.

The leaching solution supply may further contain an oxidizing tank in fluid communication with the mixer tank and the dispenser tank and adapted to formulate the respective leaching solution.

The leaching solution supply may further comprise a plurality of inlet conduits to provide at least one reagent chosen from gaseous ozone in micro-bubbles, gaseous oxygen, hydrogen peroxide, and mixtures thereof, to the oxidizing tank in the leaching solution supply.

In embodiments, the mixer tank containing the leaching solution has one or more additional inlet conduit to provide one or more of: oxidizing solution from heap irrigation, pregnant liquor solution (PLS) and intermediate liquor solution (ILS) from the heap leaching of the copper recovery process to the leaching solution supply module.

BRIEF DESCRIPTION OF THE DRAWINGS

Non-limiting examples of embodiments of the disclosure are described below with reference to figures attached hereto. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements.

Figure 1:
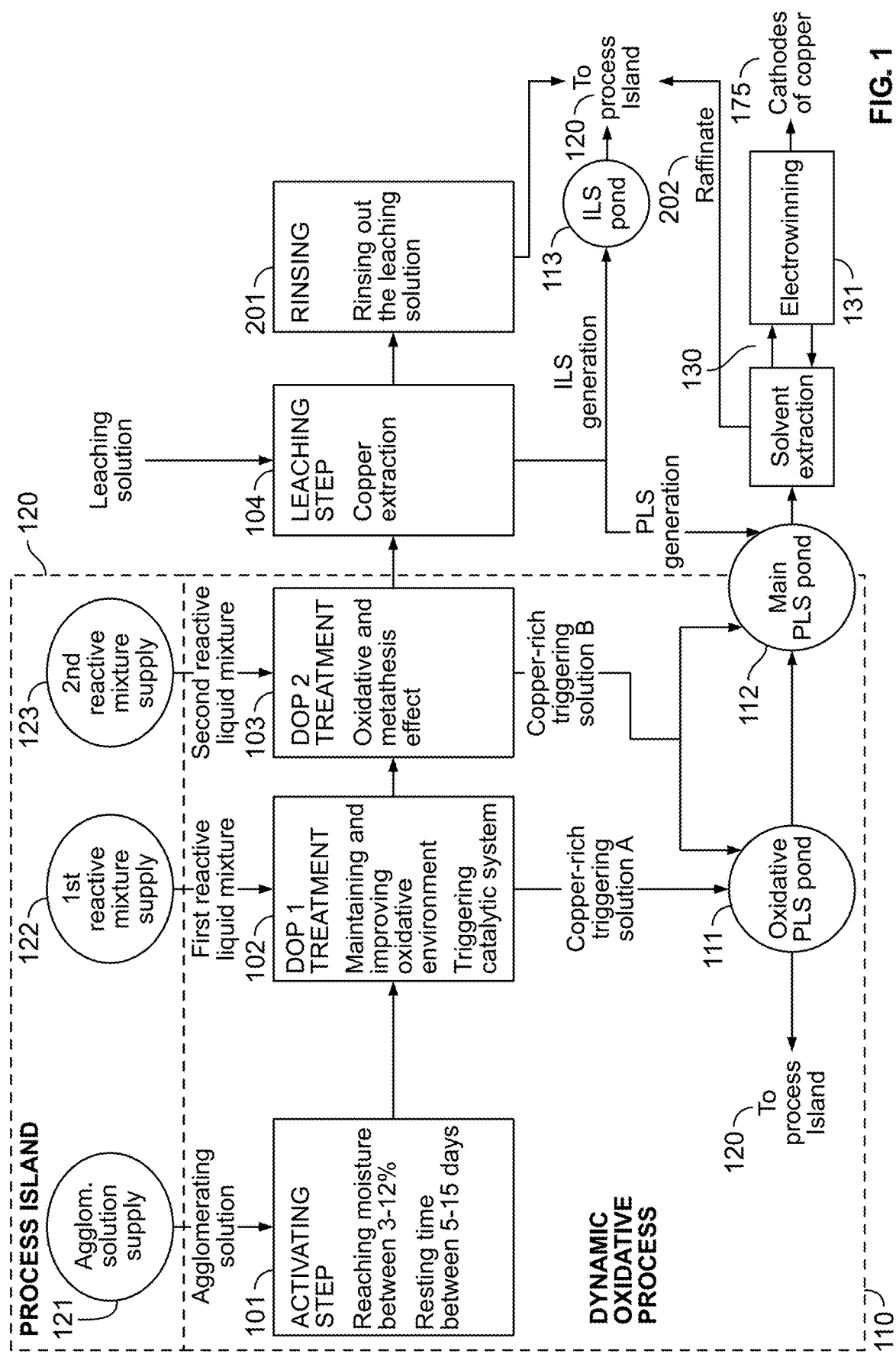
FIG. 1 schematically depicts an overview of the dynamic oxidative process according to embodiments of the invention.
Figure 1A:
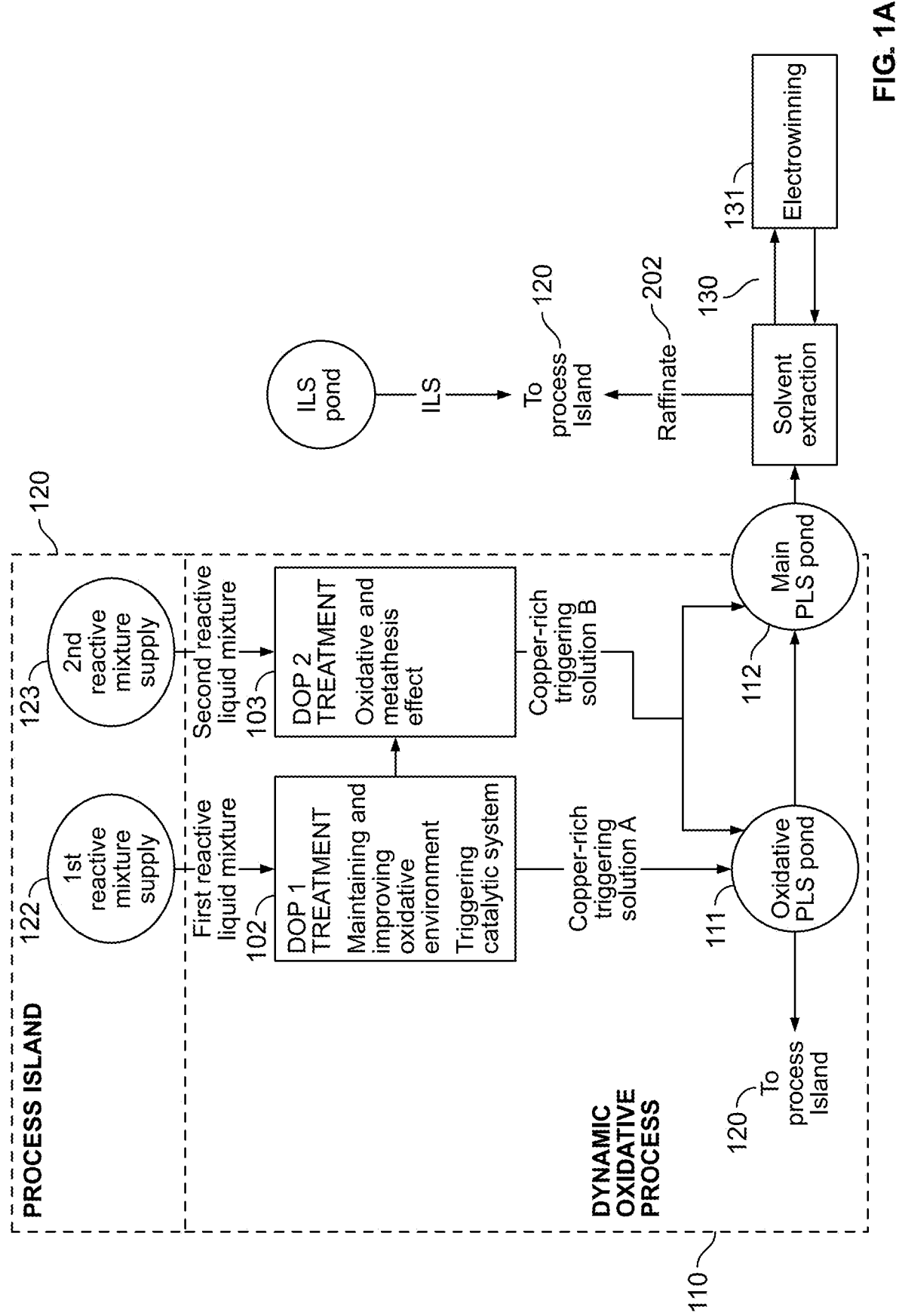
FIG. 1A is a detail of FIG. 1 depicting details of the dynamic oxidative process.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

"Dynamic oxidation" is a process of irrigating a copper heap with one or more oxidative solution(s) at a lower flow rate than is used during a subsequent leaching stage to affect oxidation-reduction potential in the heap and/or to promote chemical activity in the heap, such as (without limitation) a metathesis related mechanism for Cpy dissolution.

Embodiments described herein relate to one or more dynamic oxidative processes ("DOPs") conducted on a heap of copper ore, which increase copper recovery. Broadly speaking, "dynamic oxidation process" also include a treatment stage referred to herein as "dynamic boost", performed after activating and prior to leaching, alone or in combination with other dynamic oxidative processes. The term "activation" or "activating", as used herein, may refer to modifications to conventional agglomeration, such as by addition of nitrate and other reagents. The term "oxidative boost" may refer to the combination of agglomeration/activation and dynamic boost stages. All of these terms are understood to be aspects of a dynamic oxidative process.

The overall process achieves its technical effect through irrigation treatments on the ore using specific reactive mixtures, sequences and irrigation rates. Different copper and/or non-copper ores and mineralogical species may be treated and leached according to different embodiments of the invention, as will be apparent from the following description. The DOP stages have been shown to be effective for copper sulfide mineralogical species, including copper sulfides rich in chalcopyrite, and may be used for other species and mixtures, such as chalcocite ($Cu_2S$), covellite (CuS), enargite ($Cu_3AsS_4$), bornite ($Cu_5FeS_4$) and digenite ($Cu_9S_5$). In some embodiments, the copper sulfide ore contains pyrite ($FeS_2$) and other iron containing mineralogical species. In some embodiments, the metal ion is copper, converted from $Cu^+$ to $Cu^{2+}$, the metal ion is $Fe^{2+}$ converted to $Fe^{3+}$. In some embodiments, the oxidation state of the sulfur is 6+, 4+, 2+, 0, 2−. The DOP stages are intended to be used with different subsequent leaching systems. Embodiments of the invention may relate to ores other than copper ores. For example, in some aspects, the method may be applied to recover metals from refractory ores of silver, cobalt, nickel, gold, rhenium, molybdenum, tungsten, zirconium and combinations thereof.

The term "copper ore" refers broadly to any material containing copper ore, at any stage in the process, including, for example, native ore that has not been treated, and copper ore that has been agglomerated, previously treated or leached, including mine tailings.

Likewise, the term "heap" refers to a heap of ore at any stage in the process, after agglomeration and stacking, after treatment with dynamic oxidation solutions, and during leaching. Generally, a heap is formed from agglomerated copper ore, but a heap may be formed from untreated, native ore. A heap may be, for example, approximately 6-10 m high with a flat top surface area of 0.1-1 $km^2$, although these dimensions are exemplary only and should not be deemed to limit the invention. A heap may be modelled using one or more columns of copper ore containing material to approximate reaction times and kinetics. Therefore, as used herein, a "heap" includes such column.

The term "irrigation rate" is given in units of $L/h \cdot m^2$, where the volume refers to a volume applied of reactive solution distributed over a specific area of the heap during a period of time and the area refers to the surface area at the top of the heap, or in the case of a column, an equivalent area.

"Ratio of solution per ton of ore" or "volume ratio", refers to a volume of reactive solution irrigated onto a ton of ore.

Embodiments herein may be used in connection with leaching secondary and/or primary copper sulfide ore, including chalcopyrite. As used herein, copper ore is said to be "primarily" copper sulfide if the copper-containing species in the native ore comprise more than 50% by weight primary and secondary copper sulfide species. Likewise, an ore is "primarily" chalcopyrite if more than 50% of the copper in the ore is contained in chalcopyrite. It is understood in this context that any native ore contains a large amount of gangue and usually more than one species of copper mineral. An ore is said to consist essentially of chalcopyrite (for example) if other species in the native ore effectively do not contribute to the recovery of copper from the ore.

The refractory nature of Cpy is explained in terms of two main phenomena: the energy of the lattice of the chalcopyrite and the ore surface passivation formed by elemental sulfur, polysulfides, and iron hydroxy compounds as byproducts of conventional chalcopyrite dissolution. These compounds form a layer hindering the metal dissolution from the ore, impeding free diffusion of reagents and slowing down the kinetics of the copper recoveries from the ore.

In biologically assisted leaching, the passivation layer is also generated by the growth of microbial communities on the Cpy surface. Overall, the refractory nature of the Cpy and other copper sulfides under traditional acid leaching is intimately related to interphase phenomena and the crystal structure of these chemical compounds. The inventors have noted a "Passivation zone" that occurs during leaching of copper sulfide ores, a levelling off in the amount of copper recovery generally achievable by acid leaching, in a copper recovery range of about 25% to 32%, which has been difficult to overcome on a commercial scale on heaps, and which is largely believed to be due to ore surface passivation.

As disclosed herein, the DOP stages cause a progressive transformation in refractory primary sulfide ores, including chalcopyrite ("Cpy"), resulting in part from continuous diffusion of ions on the ore surface, particularly, on the double layer of the dynamic liquid phase, enabling $Cu^{2+}$ ions and eventually $NO_x$-derived chemical species such as $NO^+$ to diffuse and enter into the crystal lattice of the Cpy, distorting the $CuFeS_2$ crystal and generating the electrochemical "diode" $[CuFeS_2]_x[Cu_{(1+x)}Fe_{(1-y)}S_2]$, which is the starting point of an electrochemical succession of catalytic reactions occurring on the Cpy lattice. In this way, the heap chemistry is optimized to unlock copper from refractory mineral species prior to leaching.

The heap chemistry and the electrochemical regime within the heap render the ore accessible to leaching, which represents a conceptual departure from conventional hydrometallurgy, wherein the driving consideration has always been to accelerate copper dissolution, so that copper cathodes can be generated through electrowinning. A focus on the electrochemical regime in the heap has resulted in processes with lower water requirement (as a result of a smaller volume of recirculating raffinate needed for enabling different and non-canonical electrochemical regimes); low or even eliminated $NO_x$ gas emissions (as a result of the chemical involvement of catalytic nitrate and nitrite species in dynamic oxidation, among other factors); and little or no formation of a passivation layer (because electrochemical regimes prevent crystallization or formation of jarosite-derived precipitates and sulfur-derived species on the ore particle surface).

In general, the baseline treatment of semiconductor n-type and antiferromagnetic materials like Cpy is strongly influenced by the aqueous and the solid state of the process. Oxidative treatment of Cpy breaks and destabilizes the Cpy lattice to release the metal. The addition of oxidants, potentially the formation of microfractures, and NOx-related physical perturbations, result in alterations to the Cpy surface, either directly or indirectly. These alterations may occur at the surface or interior of the crystalline lattice, leading to a distortion in the Cu—S and Fe—S molecular bonds and alterations in the electronic densities of the atoms involved, as compared to the basal crystalline structure of Cpy which enables the continuity of electron flows on the Cpy electrode ultimately leading to its dissolution and high copper recoveries observed. Thus, a progressive ore transformation is deployed to facilitate chemical conversion of the refractory structure of the Cpy ($CuFeS_2$), to chemical intermediate species such as $CuS$, $Cu_2S$, and $CuS_2$. These intermediate species may then be further dissolved in conventional leaching processes.

Modifications to conventional initial ore agglomeration as well as activation, the dynamic boost, DOP 1 and DOP 2, and finally, the copper-rich solution for further cathode production—the entire dynamic oxidative process—may be geared to prevent depletion of the $[CuFeS_2]_x[Cu_{(1+x)}Fe_{(1-y)}S_2]$ diode to minimize the passivation of the Cpy ore surface, allowing dissolution of copper sulfides by further leaching.

In embodiments, nitrate ions are used in concentrations and dosages below the amounts dictated by the global stoichiometric relationship with Cpy, typically described in the prior art, as follows:

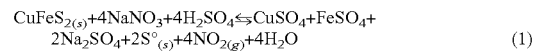

$$CuFeS_{2(s)}+4NaNO_3+4H_2SO_4 \leftrightharpoons CuSO_4+FeSO_4+ \\ 2Na_2SO_4+2S°_{(s)}+4NO_{2(g)}+4H_2O \quad (1)$$

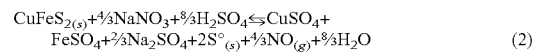

$$CuFeS_{2(s)}+\tfrac{4}{3}NaNO_3+\tfrac{8}{3}H_2SO_4 \leftrightharpoons CuSO_4+ \\ FeSO_4+\tfrac{2}{3}Na_2SO_4+2S°_{(s)}+\tfrac{4}{3}NO_{(g)}+\tfrac{8}{3}H_2O \quad (2)$$

Instead, the treatment of refractory ores according to embodiments of the invention relies on the power of breaking and destabilizing the copper sulfide crystal lattice to release copper. As noted, n-type and antiferromagnetic materials like Cpy are strongly influenced by the aqueous and the solid state of the process.

The progressive ore transformation, activated under high anodic potentials (e.g., above 700 mV, above 750 mV, above 770 mV, 800 mV and above), occurs at the surface of the Cpy as a semiconductor, which becomes electrically charged and shifts the energy level. Therefore, this behavior enables a non-stoichiometric liberation of iron ions and sulfur from the basal lattice and finally generates a diode of Cpy semiconductor type n and p, deficient in iron with electrons flowing through the diode $[CuFeS_2]_x[Cu_{(1+x)}Fe_{(1-y)}S_2]$, which enables the continuity of electron flows on the Cpy electrode, ultimately leading to its dissolution and high copper recoveries observed.

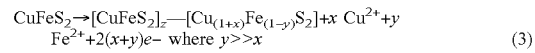

$$CuFeS_2 \rightarrow [CuFeS_2]_x-[Cu_{(1+x)}Fe_{(1-y)}S_2]+x\ Cu^{2+}+y \\ Fe^{2+}+2(x+y)e-\ \text{where}\ y>>x \quad (3)$$

During the dynamic oxidative process, Cpy particles are embedded into a saturated system due to the limited solution drainage and the low moisture of the system (e.g., 3-12%). Moreover, if generated, NOx emissions will be immersed and get trapped into this triphasic system. Nitrate derived chemical species are generated in the aqueous phase, likely including but not limited to $NO_x$, $HNO_2$, and other highly reactive oxi nitrogenous reactive species (ONRS). This complex system of chemical reactions, governed by capillary-related forces and several catalytic and electrocatalytic mechanisms, finally allows the refractory nature of Cpy to be overcome and further release copper into solution.

Elevated ion diffusion at the dynamic boost step, and the successive slow and gradual increase in the reactive mixture flow dynamics within the ore body during DOP 1 and DOP 2 stages result in a reduction in the salt precipitation phenomena in pores or over the surface of the ore. This, in turn, reduces passivation of the surface, reduces uncontrolled gas emissions and accelerates copper movement from the lattice of the ore to the liquid phase. Activation, dynamic boost, and DOP1+DOP2 taken separately or together, allow for a reduction in the refractoriness of copper sulfide species.

The following equations (together with equations (1) and (2)) describe redox reduction of nitrous and nitric acid in the chemical environment of DOP. Nitrate derived species (reactions 4, 5, 6) may react with the semiconductive Cpy to finally oxidize the copper sulfide (reactions 7, 8, 9, 10, 11).

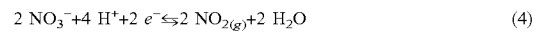

$$2\ NO_3^-+4\ H^++2\ e^- \leftrightharpoons 2\ NO_{2(g)}+2\ H_2O \quad (4)$$

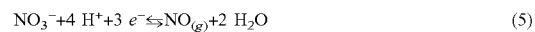

$$NO_3^-+4\ H^++3\ e^- \leftrightharpoons NO_{(g)}+2\ H_2O \quad (5)$$

$$NO_3^-+3H^++2\ e^- \leftrightharpoons HNO_2+H_2O \quad (6)$$

$$[Cu_{(1+x)}Fe_{(1-y)}S_2] \rightarrow (1-x)Cu^{2+}+(1-y)Fe^{3+}+2S°+(5-2x-3y)e^- \quad (7)$$

$$[Cu_{(1+x)}Fe_{(1-y)}S_2]+NO_3^-+H^+ \rightarrow Cu^{2+}+Fe^{3+}+S°+NO_{2(g)}+H_2O \quad (8)$$

$$[Cu_{(1+x)}Fe_{(1-y)}S_2]+NO_3^-+H^+ \rightarrow Cu^{2+}+Fe^{3+}+S°+NO_{(g)}+H_2O \quad (9)$$

$$[Cu_{(1+x)}Fe_{(1-y)}S_2]+NO_3^-+H^+ \rightarrow Cu^{2+}+Fe^{3+}+S°+HNO_2+H_2O \quad (10)$$

$$[Cu_{(1+x)}Fe_{(1-y)}S_2]+HNO_2 \rightarrow Cu^{2+}+Fe^{3+}+S°+NO_{(g)}+H_2O \quad (11)$$

A progressive ore transformation is deployed to facilitate the chemical conversion of the refractory structure of the Cpy, to chemical intermediate species such as CuS, $Cu_2S$, and $CuS_2$. Thereby, $Cu^{2+}$ is released from the Cpy lattice, increasing the molar ratio of copper based on Chalcopyrite [$Cu^{2+}$ in solution]/[Cpy]. During DOP, this molar ratio will fluctuate between 0.1-0.3 (in DOP1) and between 0.3 to 0.6 in the DOP2. Metathesis reactions (see below (12)-(15)) may be mediating this process, by means of Cpy transformation into other copper sulfide intermediate species:

$$CuFeS_2+3CuSO_4+3\ FeSO_4 \rightarrow 2Cu_2S+2Fe_2(SO_4)_3 \quad (12)$$

$$5CuFeS_2+11CuSO_4+8H_2O \rightarrow 8Cu_2S+5FeSO_4+8H_2SO_4 \quad (13)$$

$$Cu_2S+Fe_2(SO_4)_3 \rightarrow CuS+CuSO_4+2FeSO_4 \quad (14)$$

$$CuS+Fe_2(SO_4)_3 \leftarrow CuSO_4+2FeSO_4+S° \quad (15)$$

$$4FeSO_4+2NO_2+2H_2SO_4 \rightarrow 2Fe_2(SO_4)_3+2\ HNO_2+2H_2O \quad (16)$$

$$2FeSO_4+2HNO_3+H_2SO_4 \rightarrow Fe_2(SO_4)_3+2\ NO_2+2H_2O \quad (17)$$

Furthermore, NOx gases which result from the reaction of nitrate ions with the $CuFeS_2$ at high low pH and in aqueous solution facilitate formation of reactive oxy-nitrogen (RONS) species within the aqueous solution. Without wishing to be bound by any particular mechanism or theory, the RONS species may also activate unreacted Cpy, thereby facilitating the conversion of elemental sulfur and polysulfides in sulfuric acid ($H_2SO_4$) and ultimately, increasing the copper dissolution kinetics of the leaching process. This phenomenon thus contributes to a reduction in $NO_x$ emission embedded in the interface gas-liquid and solid, thereby preventing the escape of gases from the heap.

Thus, dynamic oxidation leverages: a) the electrochemical potential first applied to the system (e.g., above 770 mV, and in embodiments between 770-1000 mV vs SHE); b) on the fast dissolution of the Cpy outer layer forming a conductive layer formed by non-stoichiometric copper and iron sulfides ($[CuFeS_2]_x[Cu_{(1+x)}Fe_{(1-y)}S_2]$); c) the $Cu^{2+}$ ion diffusion; and d) $NO_3$ derived aqueous species, such as Radical Nitrogen Oxygen Species ($NO^{+\cdot}$ radical ion generated during the anodic dissolution of Cpy). Overall this multivariable and complex system diminishes the refractoriness of the Cpy crystal, avoiding the depletion of the diode $[CuFeS_2]_x$ $[Cu_{(1+x)}Fe_{(1-y)}S_2]$, enabling the process to reach a high efficiency within a temperature range of 30-45° C., which is a normal temperature within a copper sulfide heap. In further embodiments, the heap is sheltered with a thermo blanket to keep the temperature at that range.

The system is designed to integrate fluid dynamics and bespoke solutions, which are dependent on the transformation stage of the treated ore. Moreover, a circulation of various solutions is employed. This integration of precise control and monitoring the triphasic environment system allows for the deployment of the entire refractory ore and at the same time capitalize on the established idle capacity of existing copper mines.

In FIG. 1, DOP stages according to embodiments of the invention are shown schematically within the lower dashed line box 110. These stages are integrated with elements of a copper recovery system in the "process island" shown within the upper dashed line box 120.

Figure 5:
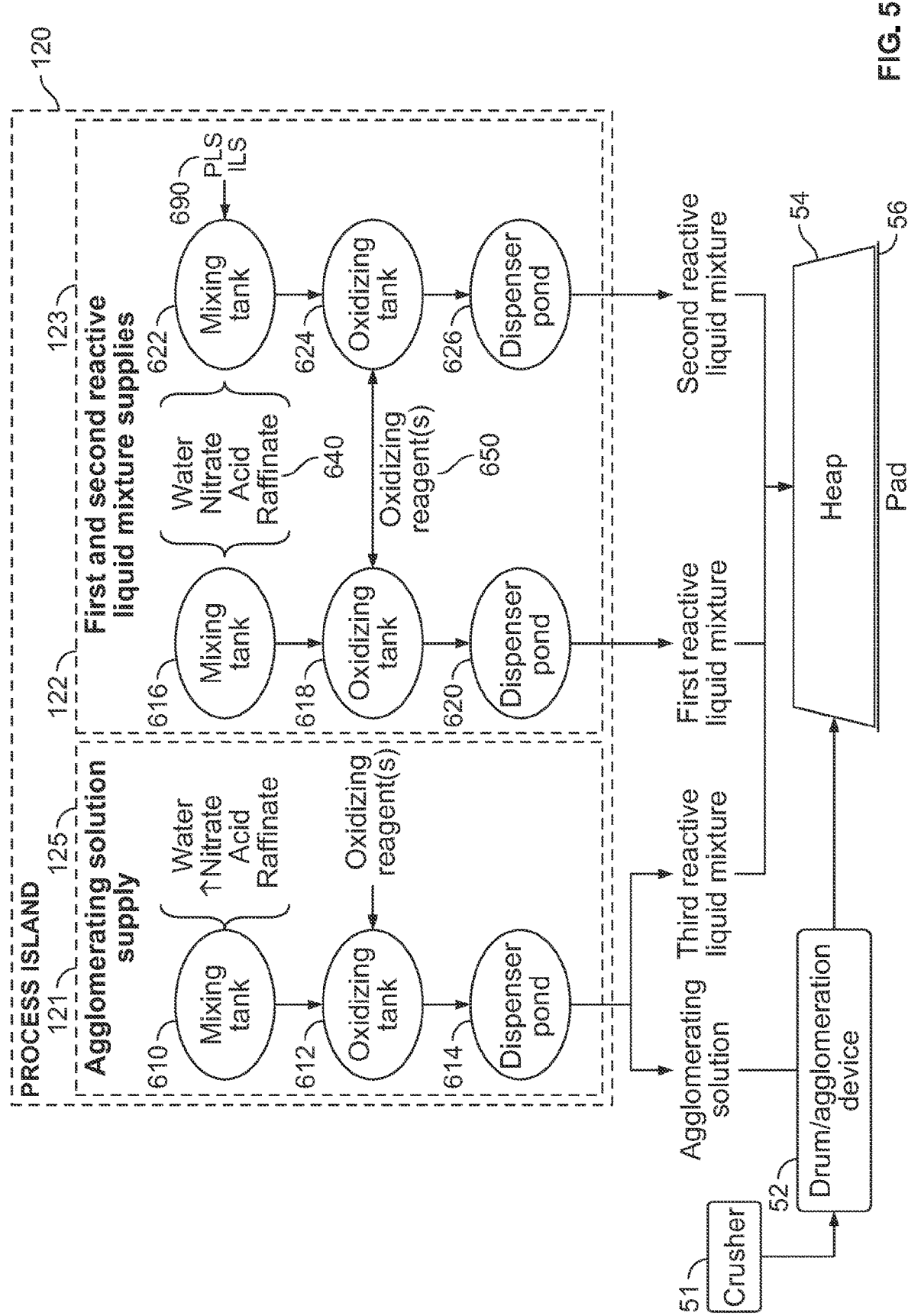
FIG. 5 schematically depicts a detail of process island according to embodiments of the invention.

Crushed ore is provided by crusher 51 to an agglomeration/activation stage 101 (shown in the detail of FIG. 5). In embodiments, ore may be crushed in a High-Pressure Grinding Roll (HPGR) or equivalent apparatus to generate microfractures into the ore. Without limitation, the crusher may be adapted to prepare ore particles of P100 or P80 size (in a range of about 0.5 to 1 inch, depending on the mineralogical composition of the ore). In some embodiments, prior to the first irrigation, a crushed ore is alternatively treated with $NO_x$ derived gases, to generate physical perturbations or microfractures into the ore.

In the activating step 101, crushed copper ore obtained from crusher 51 may be agglomerated in an agglomeration device 52, such as a drum, with an agglomeration solution provided from an agglomeration solution supply 121.

In embodiments, activating solution comprises at least nitrate ions, sulfuric acid, at least one of ferric ions and ferrous ions, an oxidizing agent, and water. The crushed particles may be wetted during agglomeration to increase porosity and to achieve adhesion of the fine particle fraction to larger particles resulting from the crushing process to yield hydraulically and mechanically stable material agglomerates.

In embodiments, after activating the ore with an agglomerating solution and prior to the first irrigation with the first reactive liquid mixture, the ore is further stabilized. For example, stabilization may comprise but is not limited to: treating the agglomerated ore in a reactor comprising stabilizing reagents selected from the group consisting of gypsum, calcium carbonate, calcium chloride, polyacrylamide or a mixture thereof and mixing the ore with the stabilizing reagents to form improved mechanical agglomerates.

The reactive mixtures described herein are aqueous. In some embodiments, water for such water-based streams is supplied as raffinate, industrial water, sea water, or a mixture thereof.

Nitrate may be provided to supply 121 and activating stage 101 in the form of $HNO_3$ (aq.), and may be provided to the agglomeration solution via agglomeration solution supply pond 121. In embodiments, the concentration of nitrate ion in the activating stage is in a range of about 0.4 M to 3.2 M. Sulfuric acid may be present in a range of about 0.2 M to 3 M. Ferric ions may be present in an amount of about 0.03 M to 0.18 M, provided for example as aqueous ferric sulfate. In embodiments, the oxidation-reduction potential ("ORP") versus standard hydrogen electrode ("SHE") in the activation stage is greater than or equal to 700 mV. In other embodiments the ORP is greater than 770 mV in the activating stage.

In some embodiments, the source of nitrate is ammonium nitrate salt, sodium nitrate salt, nitrite salt, nitric acid, nitrous acid, caliche, or a mixture thereof. In some embodiments, the nitrate source contains sulfates, chlorides, magnesium, calcium, potassium, Fe—Al—Mg—Na silicates, clays, alite, quarts, thenardite, iodine derived salts or a mixture thereof. In some embodiments, the nitrate source is in crystal, granules or refined salt. In some embodiments, the source of nitrate is natural or synthetic. In further embodiments, the nitrate source is of high grade or contains impurities. In some embodiments of the aforementioned aspect and embodiments, any of these sources are combined generating a nitrate-blend.

In some embodiments, the nitrate source is nitrogen gas converted into nitric acid, nitrous acid or a mixture thereof. In some embodiments, the source of nitrate comprises nitrate sources externally supplied, nitrate sources generated in situ, or a mixture thereof. In further embodiments, the nitrate source is directly injected into the systems from the source. In some embodiments, the nitrate source is added to the system as salt and is mixed within the tank system to form an homogenous solution before being conducted to the ore. In some embodiments, the nitrate source is in the raffinate generated after processing nitrate-containing PLS by solvent extraction. The nitrate source is an ammonia subproduct of industrial processes such as the hydrolysis of water to form hydrogen. The nitrate source may be ammonia oxidized to form intermediate ammonia derived species which is in situ connected to the system. Any of these sources may be combined generating a nitrate blend.

In further embodiments, the nitrate derived catalytic species are externally generated in a reactor, and directly conducted to contact the ore. In some embodiments, the catalytic species are in situ generated and directly added to the ore surface. In some embodiments, catalytic nitrate-derived species are selected, but not limited, from the group consisting of: nitrate ions, nitrite ions, $NO_3^-$, $NO_{2(g)}NO_{2(aq)}$, $NO_{(g)}$, $NO_{(aq)}$, $HNO_2$, $NO^+$, $NO^+$, $NO^-$, $N_2O_{4(g)}$ or a mixture thereof. In some embodiments, catalytic nitrate-derived species are mixed with $Fe^{2+}$, $Fe^{3+}$, $Cu^{2+}$ and other cations, $[Fe(NO)]^{2+}$, or $[Cu(NO)]^{2+/1+}$ or a mixture thereof.

In some embodiments, the catalytic species are externally generated in a reactor or tank, connected to the system of solutions and piping in process island 120. In some embodiments, the catalytic species are generated within the heap. In some embodiments, the catalytic species mixture is generated within the heap and externally, in a mixture thereof. In some embodiments, formation of catalytic species is promoted by heating within process island 120.

In embodiments, the system comprises, within the process island, at least one solid-liquid mixer, at least one stirred tank, and at least one valve in order to mix the nitrate ions, the sulfuric acid, the water, and other compounds fed from each conduit, and prepare the agglomeration solution, the reactive liquid mixture, and the leaching solution. In embodiments, process island 120 is configured to supply specified amounts of the agglomeration solution, the reactive liquid mixtures and the leaching solution according to an amount of copper ore to be treated.

In some embodiments sulfuric acid may be generated in situ by providing a sulfur rich solid residue source, aerating the sulfur rich solid residues and irrigating them with a solution comprising sulfur-oxidizing bacteria, such as *Acidithiobacillus thiooxidans*, and acidified water, recovering an acidified solution from the bottom of the sulfur rich source to be refined and reinserted into the system. In further embodiments, the refining process for the acidified solution may be selected from the group consisting of ion exchange, electrochemical separation and solvent extraction. In further embodiments, the ion exchange process for the refining process for the acidified solution comprises treating the acidified solution with any resin absorbing sulfuric acid. In other embodiments, the sulfuric acid is generated in situ by pyrite containing ores and further injected into the system. In other embodiments, part of the acid required is generated within the heap, due to the presence of pyrite or other related chemical species in the ore. In other embodiments, the sulfuric acid is recycled from SX process, generating an acid containing raffinate. In other embodiments, the sulfuric acid is a byproduct of refinery process. In some embodiments, any of these generated solutions are recirculated to the system and readjusted to be further reused in the method. In some embodiments, the acid source is a mixture of the generated solutions described above.

In other embodiments, the iron source is a ferric containing raffinate, a ferrous containing raffinate, ferric sulfate, ferrous sulfate, or a mixture thereof. In other embodiments, the ferric source is obtained by externally oxidizing ferrous iron by iron oxidizer bacteria such as *Acidithiobacillus ferrooxidans*. In further embodiments, the ferric iron is reduced to ferrous iron externally by iron-reducing bacteria such as *Shewanella* spp.

The lixiviant may be added to the heap 54 via a typically equi-spaced network of plastic pipes laid on top of the heap. Such conduits are sized with suitable pumping according to the flow rates described above.

In some embodiments of the invention, PLS, copper-rich triggering solution A and copper-rich triggering solution B may be collected on a sloped impermeable liner or "pad" 56 at the base of the heap and directed to a respective storage pond. In some embodiments, the $Cu^{2+}$ rich stream source is locally generated by a downstream process (such as SX/EW) or is externally generated by a refinery process. In further embodiments, the copper rich stream is a mixture of in situ and ex situ copper rich generated solutions.

Activation prepares the copper from refractory ores, such as chalcopyrite, to be more available for extraction in the later stages. The wetting process may be performed while the material is being agglomerated, in an agglomeration drum, or using other wetting systems. For example, activating may be conducted in one or more drums until a moisture content in a range of 3-12 percent is reached. In embodiments, gasses produced in the agglomerating step may be treated in a gas scrubber to remove or recover chemical species such as $NO_x$, but the generation of such species is minimized according to the principles of the process described herein.

In embodiments, the agglomerating solution further comprises hydrogen peroxide, or other oxidizing reagents to increase the ORP. In embodiments, the agglomeration solution further comprises raffinate 202 from SX/EW 130 with water. Water replenishment may be required in process island 120 to replace evaporative and ore hold-up losses.

Following activation, the ore is stacked in a heap and allowed to rest. In embodiments, when using the DOP stages described herein, relatively short rest times, no more than 15 days, for example 5 to 15 days, may be effective to promote copper recovery, even more effective than longer rest times practiced in the prior art. Longer resting times as practiced in the art may lead to passivated ore surface. This resting time allows the oxidative power of the agglomeration solution to achieve transformation of the material, making copper from refractory ores available for extraction in the later stages. In embodiments, the copper ore may be wetted during the stacking process, for example on conveyor belts on which the ore is transported.

In FIG. 1 "DOP 1 Treatment" 102 depicts a first stage of dynamic oxidation performed on the stacked heap. This stage is characterized by relatively low irrigation rates and volume ratios compared to later leaching stage(s) and compared to leaching stages practiced in the prior art. In embodiments, DOP 1 Treatment 102 includes irrigation with a first reactive liquid mixture, comprising at least nitrate ions, sulfuric acid, iron ions, and an oxidizing reagent (for ORP adjustment of the reactive mixture) in an aqueous mixture. In embodiments, nitrate ion is present at a concentration up to about 0.4 M, for example in a range of 0.02 M to 0.4 M. Sulfuric acid may be present in a range of about 0.05 M to about 1 M, iron ions (present as both ferric ions and ferrous ions) may be present in a combined amount of about 0.02 M to 0.3 M. hydrogen peroxide may be provided in an amount less than 0.3 M, for example in a range of about 0.03 M to 0.3 M, which may serve to control the ferric/ferrous conversion in addition to adjusting electrochemical conditions of the reactive mixture such as increasing the oxidative potential of the reactive mixture. Copper ions may be present in the first reactive liquid mixture in a concentration less than 2 mM. The first reactive liquid mixture may be irrigated onto the heap at an irrigation rate of less than 5 $L/h \cdot m^2$, for example in a range of about 0.5-5 $L/h \cdot m^2$ and in embodiments 1-3 $L/h \cdot m^2$. The concentration of nitrate ions, sulfuric acid, iron ions, and hydrogen peroxide maintains an oxidative environment. In embodiments, said DOP 1 irrigation treatment may be conducted until reaching a volume ratio of about 0.1-0.5 $m^3$ of said first reactive liquid mixture per ton of copper ore. In embodiments first reactive liquid mixture for the first irrigation may be substantially free of copper ions. "Substantially free of copper ions" in this context means that an amount of copper ions present (e.g., from recirculated raffinate or from another source) does not affect the oxidation potential of the mixture or otherwise impact the kinetics of the first irrigation 102 (DOP 1). Thus, generally the concentration of copper ions in the reactive liquid mixture used in the first irrigation is less than 2 mM.

An oxidizing solution, "triggering solution A" may be obtained from the bottom of the heap after the first irrigation treatment, retained in pond 111, and recirculated to process island 120 for use as a copper-containing solution in subsequent steps. Oxidizing solution A has an increased copper concentration compared to the first reactive liquid mixture. Triggering solution A is not used as a product stream for copper recovery except for small amounts forwarded to Main PLS pond 112 for combination.

In embodiments, the first reactive liquid mixture further comprises, gaseous ozone in micro and nano bubbles, gaseous oxygen in micro and nano bubbles, air in micro and nano bubbles, or a mixture thereof. These oxidizing reagents also impact the ferric/ferrous rate, enhancing the oxidative properties of the mixture. In embodiments, the first reactive liquid solution may further comprise raffinate 202 with water. Water replenishment in process island 120 may be required to replace evaporative and ore hold-up losses.

DOP 2 irrigation treatment 103 with a second reactive liquid mixture follows DOP 1 treatment 102. The second reactive liquid mixture, supplied from supply area 123, comprises at least nitrate ion, sulfuric acid, iron ions, hydrogen peroxide, and further contains copper-containing solution. In embodiments, the copper-containing solution comprises Intermediate Liquor Solution ("ILS"), e.g. leachate prior to full copper extraction from the heap, and/or copper-rich triggering solution A from the first irrigation stage (DOP 1), which is held in pond 111. Copper containing solution may further contain copper rich triggering solution, from the second irrigation stage (DOP 2) which is likewise held in pond 111 and recirculated to process island 120.

In embodiments, nitrate ion is present in second reactive liquid mixture (also called "Reactive Mixture B" in some embodiments) in an amount up to about 0.4 M, for example in a range of 0.02 M to 0.4 M. Sulfuric acid may be present in a range of 0.05 to 1.0 M. Iron ions, which may be present as ferric ion and ferrous ion, may be present in a range of 0.02 M to 0.3 M. Hydrogen peroxide may be present in an amount up to 0.3 M, for example in a range of 0.03 M to 0.3 M. Hydrogen peroxide is used to adjust electrochemical conditions of the reactive mixture. Copper ions may be present in second reactive liquid mixture in a range of 2 mM to 100 mM, which may provided from triggering solution A in pond 111, from Intermediate Liquor Solution (ILS) in pond 113, and from Pregnant Liquor Solution (PLS) in pond 112, or a combination thereof, constituted in process island 120 in pond 123.

The second reactive liquid mixture used for the second irrigation may be provided to the heap at a rate in a range of up to about 5 $L/h \cdot m^2$, for example 1-5 $L/h \cdot m^2$, and in embodiments 1-3 $L/h \cdot m^2$. In the stated concentrations, in conjunction with the low irrigation rate, the oxidative environment (greater than 700 mV SHE) achieved in DOP 1 is maintained in DOP 2.

In embodiments, the DOP 2 irrigation treatment may be conducted until reaching a volume ratio of about 0.1-0.5 $m^3$ of the combined reactive mixtures in a ton of copper ore. In embodiments, Triggering Solution B obtained from the heap subjected to DOP 2 irrigation treatment may be added to pond 111 or pond 112.

In embodiments, the oxidizing agent in the Reactive Mixture B used in the second irrigation stage is selected from the group consisting of aqueous hydrogen peroxide, gaseous ozone in micro and nano bubbles, gaseous oxygen in micro and nano bubbles, air in micro and nano bubbles. These oxidative reagents also interact with the ferric/ferrous rate, enhancing the oxidative properties of the solution. In embodiments, the nitrate source on the raffinate comes as a nitrate-derived chemical species that requires oxidation by oxidizing reagents. In some embodiments an advance oxidation process is incorporated to the oxidizing tank for adjusting redox conditions of the reactive mixtures. In embodiments, the Reactive Mixture B further comprises raffinate with water replenishment. Water make-up may be required to replace evaporative and ore hold-up losses.

Referring again to FIG. 1, leaching may be performed on the heap after the DOP 2 irrigation in leaching stage 104, characterized by a higher irrigation rate of about 5-10 $L/h \cdot m^2$ and increased copper extraction. Applying dynamic oxidation steps to the heap (DOP 1 and DOP 2) will prepare the ore for leaching whatever leach system is used, including chloride-based leaching systems. However, in embodiments, leaching solution comprises at least nitrate ions present in an amount up to about 160 mM, for example 1 Mm to 160 mM; sulfuric acid in a range of 0.05 M to 1 M; and iron ions (present as ferrous and ferric ions) in a range of 1 mM to 180 mM. Each of these reagents enhances the electrochemical properties of the reactive mixture for further leaching of copper from the ore. In embodiments, the leaching solution further comprises raffinate with water replenishment. Water make-up in process island 120 may be required to replace evaporative and ore hold-up losses.

Figure 2:
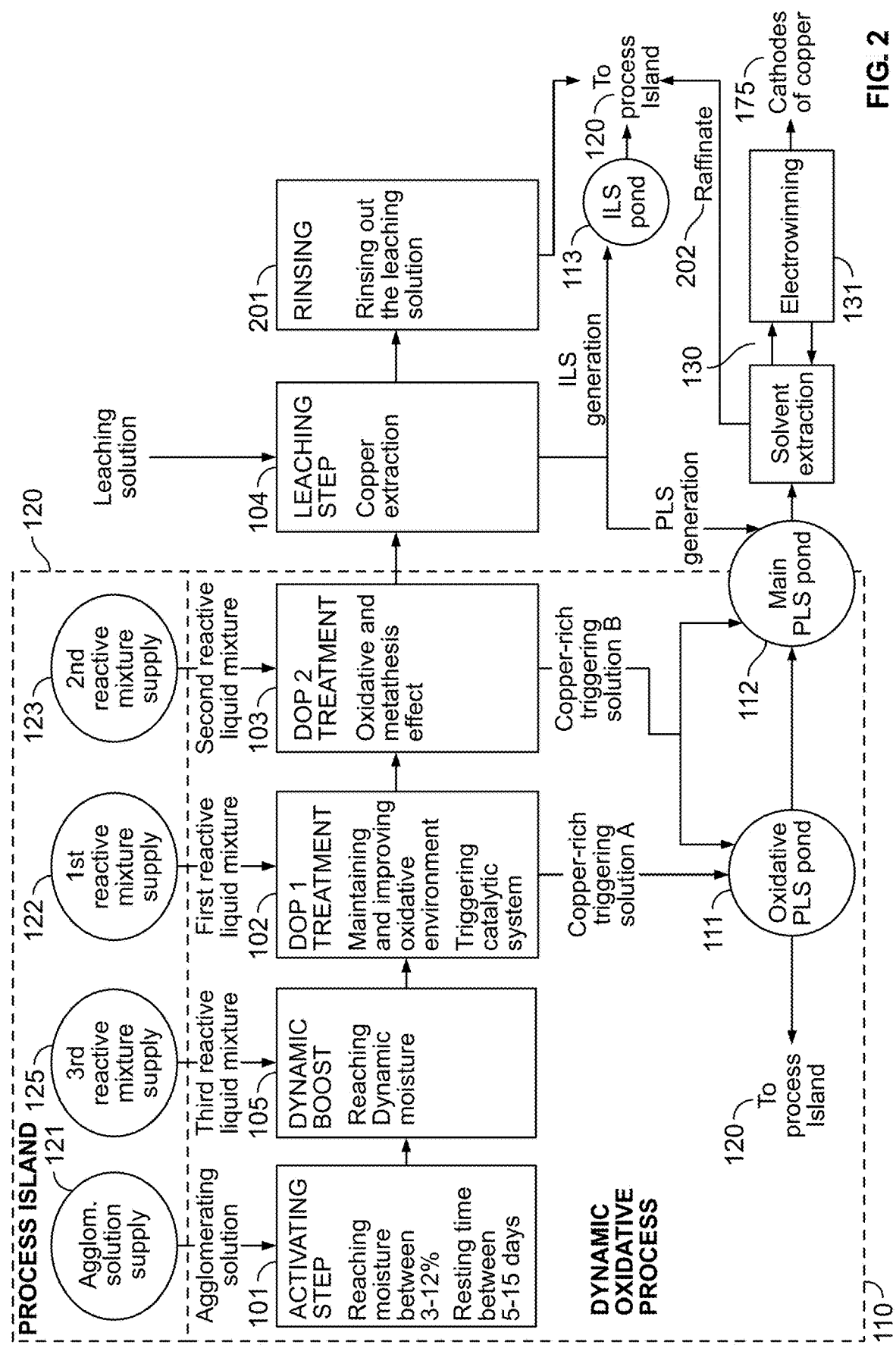
FIG. 2 schematically depicts an overview of the dynamic oxidative process, according to other embodiments of the invention.
Figure 2A:
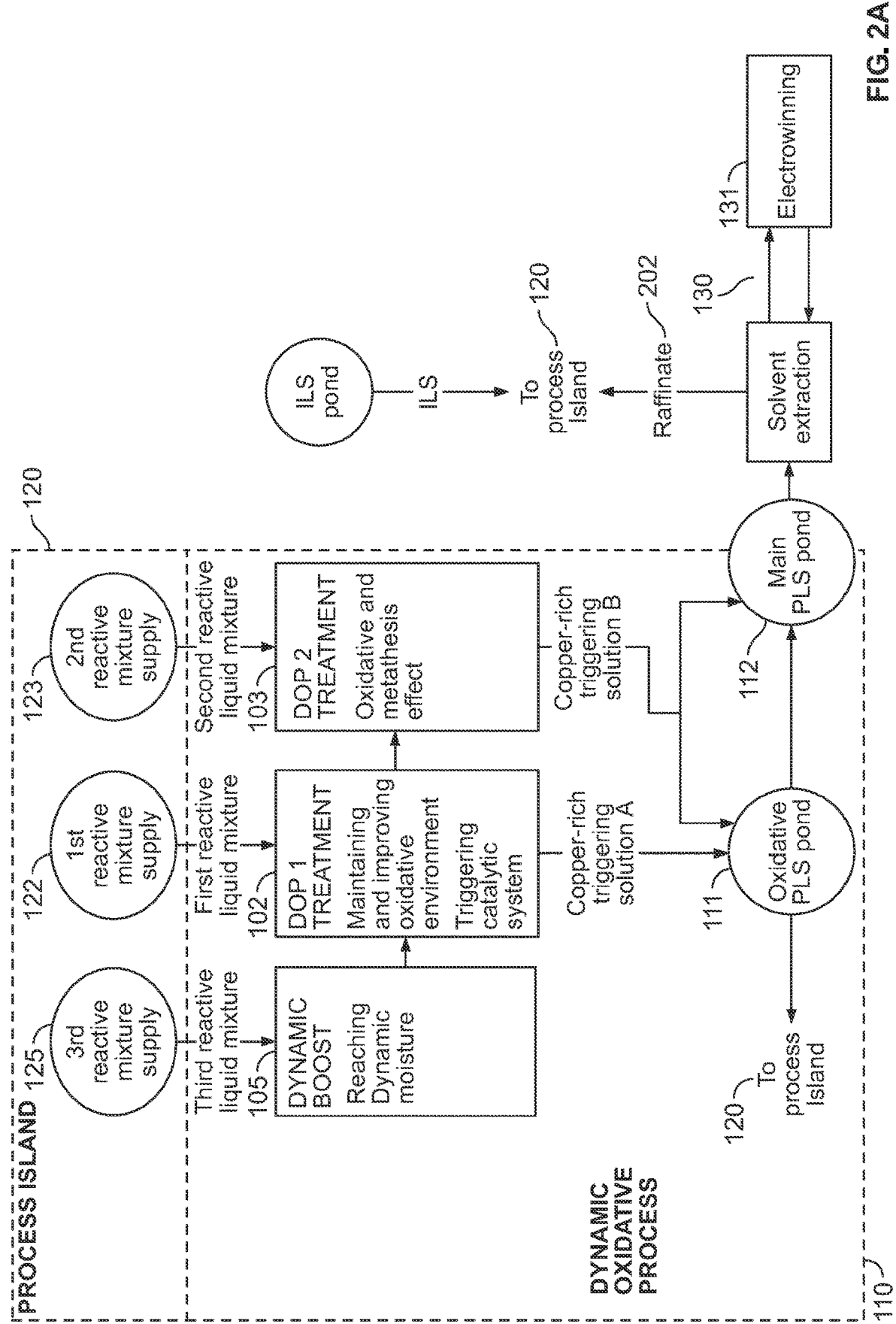
FIG. 2A is a detail of FIG. 2 depicting details of the dynamic oxidative process.

In embodiments, as shown in FIG. 2, a further treatment of the heap may be added prior to the first irrigation treatment, or substituted for the first and second irrigation treatments, to achieve dynamic oxidation. This treatment step 105, referred to as a "dynamic boost" may be conducted with a third reactive liquid mixture ("Reactive Mixture C") after the heap has been left to stand, for example for 5 to 15 days. In this stage, the heap is treated with an aqueous third reactive liquid mixture comprising nitrate ion, sulfuric acid, ferric ions, and hydrogen peroxide or other oxidizing agent, at a low flow rate and without withdrawing leachate from the bottom of the heap. In embodiments, the concentration of nitrate ion, sulfuric acid, ferric ions and hydrogen peroxide in the third reactive liquid mixture may be in a range of about 0.4 M to 3.2 M, about 0.2 M to 3 M, about 0.03 M to 0.18 M, and up to about 150 mM, respectively. The third reactive liquid mixture may be used in the dynamic boost irrigation step at a rate of about 1-5 L/h·m$^2$, for example 1-3 L/h·m$^2$. In embodiments, the dynamic boost step is conducted until the heap reaches a state having an amount of solution retained therein before solution is able to be drained from the bottom of the heap. The third reactive liquid mixture composition, in conjunction with the irrigation rate, and the state of dynamic moisture, enhances the oxidative environment achieved by the activating and curing step, especially on stable, refractory copper ores: In embodiments, gasses produced in the dynamic boost step may be treated in a gas scrubber to remove or recycle gaseous chemical emissions. In embodiments, the third reactive liquid mixture further comprises raffinate with water make-up. Water make-up may be required to replace evaporative and ore hold-up losses.

In embodiments, using the reagents described, each of the agglomeration solution, the first, second and third reactive liquid mixtures and the leaching solution comprise a redox potential higher than 700 mV (vs NHE) and a pH less than 2. In embodiments, the heap is maintained at a temperature in a range of about 30-45° C. as a result of exothermic chemical activity in the heap during each of the dynamic boost step, DOP 1 DOP 2 and leaching stages. In embodiments, the temperature of the heap may be controlled by heating or cooling first reactive liquid mixture, second reactive liquid mixture, third reactive liquid mixture, and the leaching solution, prior to irrigation onto the heap, not limited by the heat exchanging devices.

Processing systems such as, e.g., ponds, tanks and inlet systems used in different embodiments of the invention may include heating systems for controlling the temperature, e.g., in accordance with the different protocols and procedures described herein—as well as filters which may be used for cleaning of processes streams and/or mixtures, where, e.g., triggering solution(s), PLSs, ILSs and/or raffinate solutions may be treated to remove undesired byproducts, precipitants, contaminant metals and solids, and the like.

As shown in FIG. 2, a method for dynamic oxidation of copper ore may comprise providing copper ore-containing material, crushing and performing an activating step 101 wherein the ore is agglomerated and cured with an agglomeration solution, to form agglomerated copper ore-containing material. The ore is stacked to form a heap and allowed to stand. A "dynamic boost" irrigation step 105 is performed on the heap with a third reactive liquid mixture from pond 125 to reach a state of dynamic moisture in the heap (e.g., to a point where copper rich solution cannot yet be withdrawn from the bottom of the heap). Thereafter a dynamic oxidation DOP 1 irrigation treatment 102 is performed on the heap with first reactive liquid solution from pond 122. Copper rich Triggering Solution A resulting from the DOP 1 irrigation 102 may be withdrawn from the bottom of the heap, stored in pond 111 and circulated to process island 120 for use in second reactive liquid mixture and potentially in the leaching solution. A second irrigation treatment on the heap with a second reactive liquid mixture may yield Triggering Solution B from the bottom of the heap, which may be combined in pond 111 and/or forwarded to main PLS pond 112. Finally, leaching is performed on the heap with a leaching solution to obtain copper-rich PLS, collected in PLS pond 112. PLS is advanced to solvent-extraction electrowinning for copper recovery. In embodiments, rinsing 201 is performed on the heap after leaching to recover residual leaching solution.

As schematically depicted in FIG. 2, the solution from copper-rich Triggering Solution A in Oxidative PLS pond 111 may be advanced to a main PLS pond. In embodiments, PLS from the main PLS pond 112 may further be advanced to a copper recovery stage 130.

In embodiments, the copper recovery stage may be a solvent extraction and electrowinning process to produce copper cathodes. In embodiments, the PLS enters the solvent extraction process for copper separation and reagents recovery. In SX/EW process 130, two streams are produced: a copper-rich electrolyte solution advanced to the electrowinning process 131 to produce copper cathodes, and a raffinate solution which may be recirculated to any of the agglomerating solution, first reactive liquid mixture, second reactive liquid mixture, third reactive liquid mixture, and/or leaching solution in a respective pond in the process island 120.

In embodiments, the raffinate PLS and ILS included in the reactive liquid mixtures is treated prior to the corresponding irrigations to obtain an aqueous solution with a ORP higher than 800 mV/ENH.

In some embodiments, the raffinate produced in the solvent extraction and electrowinning process (SX/EW) may be purged. In embodiments, the purged raffinate is advanced to a purge pond, wherein the purged raffinate is treated before disposal. In some embodiments, the raffinate is purged for metal abatement produced by exopolysaccharide-containing bacteria or other microorganisms. In some embodiments, the raffinate is purged by physical filters. In some embodiments, the raffinate is purged by chemical methods. In further embodiments, the purged raffinate treatment comprises acid-base neutralization methods, heavy metals precipitation, solid-liquid separations or a combination thereof.

In other aspect, the invention is a method for the recovery of metal values from at least two different Pregnant Liquor Solution (PLS) streams obtained from at least two different sources of metal ore-containing material, comprising: providing at least two different Pregnant Liquor Solution (PLS) streams from at least two different previously leached metal ore-containing materials, wherein at least two of said previously leached metal ore-containing materials comprise a different combination of types of metal ore-containing material, and/or have been previously subjected to different leaching processes and/or have been previously leached using reactive liquid mixtures; performing at least two separated solvent extraction processes of the different PLS streams and obtaining at least two compatible metal rich electrolyte streams; Collecting at least two compatible metal rich electrolyte streams in at least two different tanks; Combining at least two compatible metal rich electrolyte streams; Subjecting the compatible metal rich electrolyte streams to a single electrowinning process; Recovering at least one of the metal-depleted raffinate streams from the electrowinning process; Recycling at least one of the metal-depleted raffinate streams and; Obtaining the metal lean electrolyte stream and a metal product. In further embodiments, the metal ore-containing material is a hydrometallurgy module comprising a heap, a dump, a tailing, a slag, a run-of-mine and/or stockpiled metal ore-containing material; wherein such a metal ore-containing material comprises copper, gold, nickel, zinc, molybdenum, cobalt, silver, and a mixture thereof. In some embodiments, the metal ore-containing materials comprise metal oxide, metal sulfides or a mixture thereof. In further embodiments, the metal ore-containing material previously leached comprise chalcopyrite. In further embodiments, the process to transform the metal value rich electrolyte is selected from the group of electrowinning, salt precipitation and crystallization. In further embodiments, the depleted metal value electrolyte is recirculated onto the heap.

FIG. 5 depicts a schematic detail of process island 120 in which supply pond 122 for first reactive liquid mixture may be provided with a mixer 616, an oxidation tank 618, and dispensing tank 620 to formulate and dispense the first reactive liquid mixture. Mixer 616 may be a continuously stirred tank reactor (CSTR) or other engineering unit capable of maintaining an aqueous solution of dissolved nitrate anion, sulfuric acid and raffinate in a uniform aqueous solution at a predetermined concentration of the reagents. Inlets 640 to the mixer may include an inlet for water make-up, an inlet for dissolved nitrate anion, an inlet for acid replenishment and an inlet for a portion of raffinate recirculated from the SX process.

Flow rates of the first reactive liquid mixture contacting the heap are lower than used for leaching, and mixer 616 and associated piping may be sized accordingly. For example, a mixing tank and associated piping may accommodate a flow rate of reactive solution less than 5 L/h·m$^2$ and in embodiments in a range of 1-3 L/h·m$^2$. Moreover, the amount of recirculated raffinate and water replenishment is significantly less than in a leaching context.

Oxidizing tank 618 may be designed to mix an oxidizing reagent into the mixture from mixer 616 and one or more inlet(s) 650 may be provided for the purpose. The oxidizing reagent may be any one of ferrous sulfate, ferric sulfate, aqueous hydrogen peroxide, gaseous ozone in micro and nano bubbles, gaseous oxygen in micro and nano bubbles, air in micro and nano bubbles, or a mixture of two or more of them, and the structure of tank 618 and inlet(s) 650 may be dictated by the required amount and nature of the oxidizing reagent to reach a required ORP, for example greater than 650 mv (vs. NHE), equal to or greater than 700 mv (vs NHE) or greater than 770 mv (vs. NHE). For example, a gaseous oxidizing reagent may be bubbled through the mixture via a perforated tube using gas supplied under pressure. A liquid reagent may be piped and an opening above the liquid level in the tank may be provided as an inlet for solid reagent.

To oxidize the compounds in the agglomerating solution and in the reactive liquid mixtures to a higher oxidation state, an electrochemical reactor can be used. The reactor may replace at least one of the oxidizing tanks in the agglomerating solution supply and in the first and second reactive liquid mixtures supplies.

Dispenser tank 620 is connected to piping adapted to distribute the mixed and oxidized reagent onto heap 54.

Second supply 123 may be one or more tanks or containers and provided with mixer 622, oxidation tank 624, and dispensing pond 626 similar in configuration to the supply pond for the first reactive liquid mixture to formulate and dispense the second reactive liquid mixture. Mixer 622 may be a continuously stirred tank reactor (CSTR) or other engineering unit capable of maintaining an aqueous solution of dissolved nitrate anion, sulfuric acid and raffinate in a uniform aqueous solution at a predetermined concentration of the reagents and may also be provided with plurality of inlet conduits to provide water replenishment, dissolved nitrate anion, a portion of raffinate solution from the copper solvent extraction process, and a copper-containing solution obtained from the irrigation of the heap with the first reactive liquid mixture maintained in the separate oxidizing triggering solution pond. Mixer 622 may further comprise one or more inlet conduit 690 to provide one or more of pregnant liquor solution (PLS) and intermediate liquor solution (ILS) from the heap leaching of the copper recovery process to provide a desired level of dissolved copper ions in the second reactive liquid mixture. Replenishment water, raffinate and make-up nitrate and acid may be provided to second reactive liquid solution supply 123 from the same source 640 that serves the first reactive liquid mixture supply 122.

A third supply pond may be provided to formulate an activation solution and/or an agglomeration solution which may be provided to one or more activation and/or agglomeration devices. Mixer tank 610, oxidation tank 612 and dispenser tank 614 may have a similar construction and configuration as the like elements in the first reactive solution pond.

Solvent extraction loop or system 130, processes a copper rich electrolyte stream to produce copper depleted raffinate solution 202, and metal cathodes after electrowinning 175. Various SX/EW components that may be included in some embodiments of the invention, e.g.: an SX/EW loop including at least one Solvent Extraction process units for the treatment of at least one PLS stream. Separate SX process units which may accept a copper lean electrolyte stream as input and produce corresponding copper-depleted raffinate streams as output; an EW unit providing a copper lean electrolyte stream as output; a Rich Electrolyte Tank (RET) system, which may receive a copper rich electrolyte stream as input, and may produce a copper rich electrolyte stream as output (which may, e.g., be fed into an EW unit); a Lean Electrolyte Tank (LET) system, which may receive a copper lean electrolyte stream as input (e.g., from an EW unit) and may produce copper lean electrolyte streams as output (e.g., to feed one or more corresponding SX units).

In some embodiments of the invention and as further discussed herein, a recirculating intermediate liquor solution (ILS) and corresponding ILS system (which may include for example a dedicated ILS pond such as for example described herein)—may be employed or used, e.g., for managing or regulating the copper concentration of a PLS, for example prior to being fed forward to SX recovery. In some embodiments, ILS may be or may comprise the acidic aqueous phase of the heap leaching process prior to metal reduction or extraction and may have a copper concentration in a range of 0.5 and 1.5 g/L, although additional or alternative concentrations and/or ingredients or reagents may be used in different embodiments.

Raffinate or a raffinate solution as used herein may refer to a water-based copper-depleted and acid-rich solution which may be, or may be obtained from an acidic aqueous phase received subsequent to metal extraction or retrieval, for example using SX/EW and/or additional or alternative procedures known in the art.

Different ponds and/or processing systems described herein may include inlet conduits to transfer or provide, e.g., ingredients and/or reagents including, but not limited to water make-up, dissolved nitrate ion, a portion of a raffinate solution from the copper solvent extraction process, aqueous ferrous sulfate, aqueous ferric sulfate, aqueous hydrogen peroxide, gaseous ozone in micro and nano bubbles, gaseous oxygen in micro and nano bubbles, air in micro and nano bubbles, and mixtures thereof.

EXAMPLES

Figure 4:
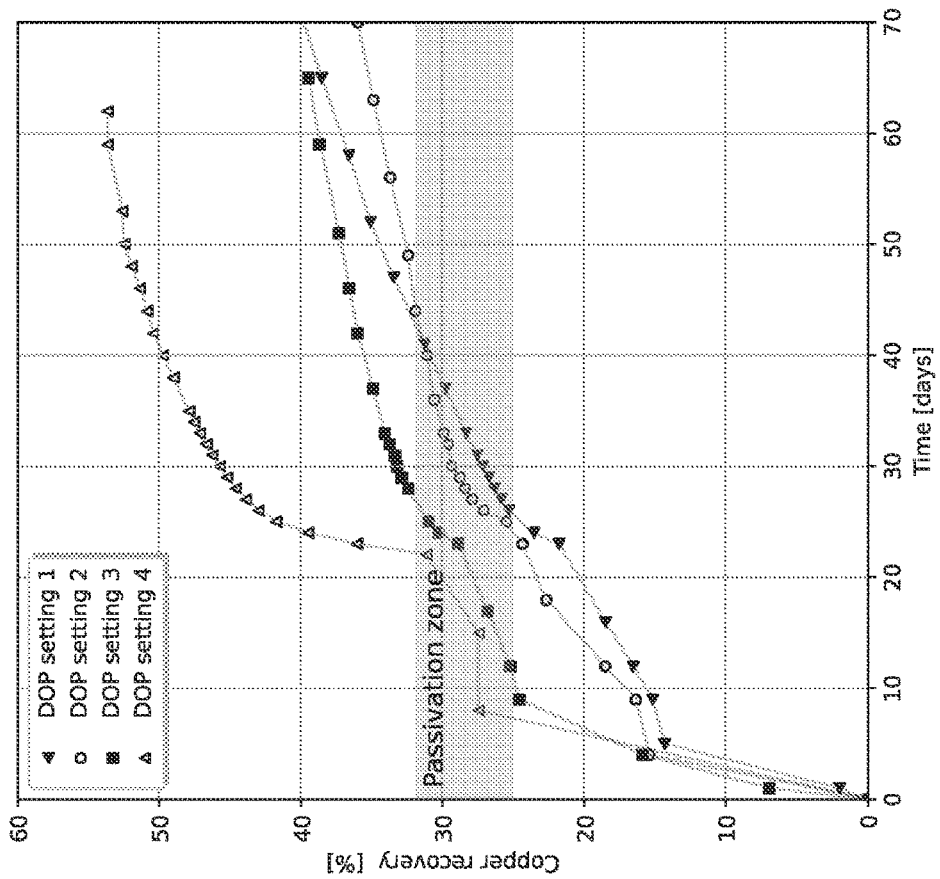
FIG. 4 shows copper recovery achieved according to embodiments of the invention.
Figure 3:
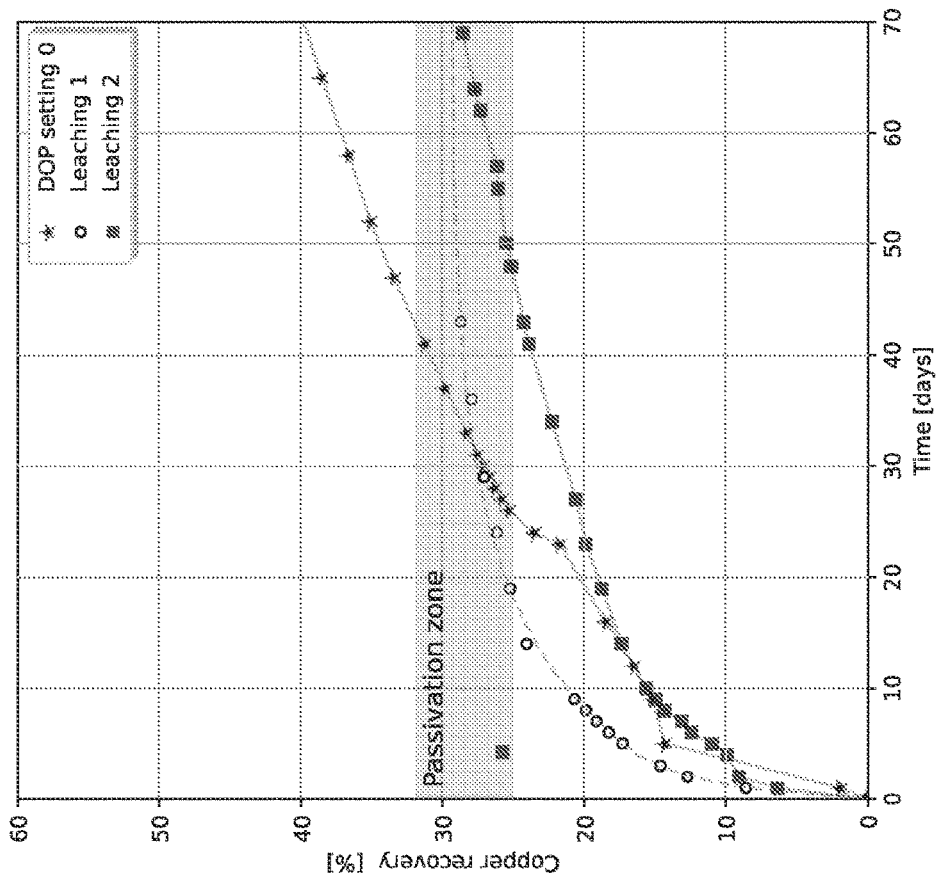
FIG. 3 shows copper recovery achieved according to embodiments of the invention, with comparative examples.

FIGS. 3 and 4 depict copper recovery according to various embodiments of the invention with comparative examples.

FIG. 3 depicts the effects of DOP on copper recovery versus operational time. For this experiment, leaching columns were prepared with crushed primary copper sulfide ore (about 84-95% of the contained copper as chalcopyrite), and to a lesser extent, secondary copper sulfide ore (up to 10% of the contained copper as covellite; and up to 10% of the contained copper as chalcocite/digenite). The ore size of the crushed material is 80% under ¾" (¾ inch). The crushed material was first subjected to a treatment designated as "Dynamic Oxidative Process setting 0" ("DOP setting 0"), consisting of an activating step, followed by a resting step of 5 days, a first irrigation with a first reactive liquid mixture, a second irrigation with a second reactive liquid mixture, and finally a leaching step. The composition, pH and redox potential of each reactive liquid mixture used in this example are shown in Table 1 below. The internal temperature of the leaching columns in each of the experiments was maintained at 30-45° C. The height of the columns employed was one meter.

TABLE 1

Electrochemical and operational conditions

| | Activating step | DOP1 irrigation treatment | DOP2 irrigation treatment | Leaching |
|---|---|---|---|---|
| Reagent used | Agglomeration solution | First reactive liquid mixture | Second reactive liquid mixture | Leaching solution |
| $NO_3^-$ | 1.4M | 0.20M | 0.16M | 0.16M |
| $H_2SO_4$ | 0.8M | 0.15M | 0.15M | 0.15M |
| $Fe_{total}$ | 0.08M | 0.10M | 0.10M | 0.10M |
| $H_2O_2$ | 0.07M | 0.07M | 0.07M | 0.07M |
| $Cu^{2+}$ | — | — | 0.006M | — |
| Ph | <1 | 1.1-1.3 | 1.1-1.3 | 1.1-1.3 |
| ORP[mV SHE] | >770 | >770 | >770 | >770 |
| Irrigation rate | — | 1.5-2.9 $L/m^2 * h$ | 1.5-2.5 $L/m^2 * h$ | 5.0-5.6 $L/m^2 * h$ |
| Ratio of solution per ton of ore used in each step | — | 0.30 $m^3$/ton | 0.40 m3/ton | — |

An additional leaching column labelled "Leaching 1" or "Acid leaching" was used as a comparative example. This column underwent agglomeration and a resting step for 5 days, followed by slow acid leaching (5-5.6 L/h·m²). This flow rate is on the low end of what would be considered feasible for conventional leaching. In this way the kinetic curves produced according to the inventive examples and according to this comparative example would be comparable. The agglomeration step for Leaching 1 was practiced using an agglomeration solution composed of 1.4 M $H_2SO_4$, 0.08 M $Fe_{total}$, a pH less than 1, and ORP of >770 mV vs SHE. This was followed by a leaching step with a leaching solution composed of 0.15 M of $H_2SO_4$, 0.1 M of $Fe_{total}$, a pH of 1.1-1.3, an ORP of >770 mV vs SHE, with an irrigation rate at 5.0-5.6 L/h·m².

As a reference, a further additional leaching column labelled "Leaching 2" or "Leaching supplemented with nitrate", underwent agglomeration and resting for 5 days, followed by a slow leaching stage. The agglomeration for Leaching 2 was practiced using the agglomeration solution described in Table 1 above and the leaching step was practiced using the leaching solution described in Table 1. Again, a low flow rate was selected for Leaching 2 to make a better comparison of the kinetic curve of the course of leaching. Consequently, the nitrate concentration used in the agglomeration, resting, and leaching steps is comparable to that of the Dynamic Oxidative Process. However, the DOP1 and DOP2 treatments, were only utilized in the aforementioned DOP leaching column (DOP setting 0).

In FIG. 3, ore subjected to the "DOP setting 0" achieved higher copper recoveries compared to acid and nitrate leaching and, significantly, surpassed the "Passivation zone". Both references, Leaching 1 and Leaching 2, remained trapped in the Passivation zone, showing a weaker performance in copper extraction of copper sulfides rich in Cpy. As seen in FIG. 3, the DOP treatment effectively unlocked the sulfide copper ore and avoided surface passivation. The kinetic curves obtained for the acid leaching (Leaching 1) and nitrate leaching (Leaching 2) were predictable based on known models. In contrast, the example according to the invention produced a novel kinetic curve.

FIG. 4 depicts the effect of various electrochemical regimes employed in the Dynamic Oxidative Process with leaching columns adapted for treating copper sulfide ores. Again, the ore used in this experiment was crushed primary copper sulfide ore (about 84-95% of the contained copper as chalcopyrite), and to a lesser extent, secondary copper sulfide ore (up to 10% of the contained copper as covellite; and up to 10% of the contained copper as chalcocite/digenite). The ore size of the crushed material is 80% under ¾" (¾ inch). The height of the columns employed was one meter.

The column labelled "DOP setting 1" was subjected to an activating step, followed by a resting step of 5 days, followed by first and second irrigation treatment stages, wherein copper-containing solution was introduced in the second irrigation stage (DOP 2). These steps were followed by a leaching step with the reactive solutions shown in the Table 2 below.

The column labelled "DOP setting 2" differed from the electrochemical regime of "DOP setting 1" in the reduction of nitrate source. The nitrate concentration in the first reactive liquid mixture (from the DOP 1 irrigation treatment), the second reactive liquid mixture (from the DOP 2 irrigation treatment), and the leaching solution (from the leaching step) were adjusted to one-third of the nitrate concentration corresponding to each solution shown in Table 2 below.

The column depicted as "DOP setting 3" was subjected to the same treatments and the corresponding reagent solution as the "DOP treatment 1", but a stronger oxidative boost was applied by means of a longer activating step (a rest period three times longer than "DOP setting 1", and a dynamic boost (DB) stage followed the first and second irrigation treatment stages. The DB stage was practiced using a third reactive liquid mixture, composed of 1.6 M $NO_3^-$, 0.8 M $H_2SO_4$, 0.08 M $Fe_{total}$, 0.06 M $H_2O_2$, a pH less than 1, and ORP of >770 mV vs SHE, with an irrigation rate of 1.5-2.9 L/m²·h. The volume ratio used was 0.05 m³/ton.

The column depicted as "DOP setting 4" was subjected to the same treatments and the corresponding solutions as the "DOP setting 1", but with a different electrochemical regime due to an adjustment of nitrate source and copper ions. The nitrate concentration in the second reactive liquid mixture (from the DOP 2 irrigation treatment) were adjusted to twice the nitrate concentration of the corresponding solution shown in Table 2 below. Conversely, the copper concentration in the second reactive liquid mixture was adjusted to eight times the copper concentration of the corresponding solution shown in Table 2 below.

The composition, pH and redox potential of each reactive liquid mixture used in "DOP setting 1", "DOP setting 2", "DOP setting 3" and "DOP setting 4", and the leaching stage, together with the operational conditions, are shown in Tables 2-5 below.

TABLE 2

Electrochemical and operational conditions of Agglomeration/Activation.
ACTIVATING STEP (Agglomeration solution)

| Condition | $NO_3^-$ (M) | $H_2SO_4$ (M) | $Fe_{(t)}$ (M) | $H_2O_2$ (M) | pH | ORP (mV SHE) |
|---|---|---|---|---|---|---|
| DOP setting 1 | 1.4 | 0.8 | 0.09 | 0.06 | <1 | >770 |
| DOP setting 2 | 1.4 | 0.8 | 0.09 | 0.06 | <1 | >770 |
| DOP setting 3 | 1.4 | 0.8 | 0.09 | 0.06 | <1 | >770 |
| DOP setting 4 | 1.4 | 0.9 | 0.05 | 0.03 | <1 | >770 |

TABLE 3

Electrochemical and operational conditions of DOP 1 treatment.
DOP1 IRRIGATION TREATMENT (First reactive liquid mixture)

| Condition | $NO_3^-$ (M) | $H_2SO_4$ (M) | $Fe_{(t)}$ (M) | $H_2O_2$ (M) | $Cu^{2+}$ (mM) | pH | ORP (mV SHE) | Volume ratio ($m^3$/ton) |
|---|---|---|---|---|---|---|---|---|
| DOP setting 1 | 0.12 | 0.15 | 0.09 | 0.06 | <1.6 | 1.1-1.3 | >770 | 0.25 |
| DOP setting 2 | 0.04 | 0.15 | 0.09 | 0.06 | <1.6 | 1.1-1.3 | >770 | 0.22 |
| DOP setting 3 | 0.12 | 0.15 | 0.09 | 0.06 | <1.6 | 1.1-1.3 | >770 | 0.35 |
| DOP setting 4 | 0.12 | 0.08 | 0.05 | 0.03 | <1.6 | 1.1-1.3 | >770 | 0.28 |

TABLE 4

Electrochemical and operational conditions of DOP 2 treatment.
DOP2 IRRIGATION TREATMENT (Second reactive liquid mixture)

| Condition | $NO_3^-$ (M) | $H_2SO_4$ (M) | $Fe_{(t)}$ (M) | $H_2O_2$ (M) | $Cu^{2+}$ (mM) | pH | ORP (mV SHE) | Volume ratio ($m^3$/ton) |
|---|---|---|---|---|---|---|---|---|
| DOP setting 1 | 0.2 | 0.25 | 0.09 | 0.06 | 5 | 1.1-1.3 | >770 | 0.41 |
| DOP setting 2 | 0.06 | 0.25 | 0.09 | 0.06 | 5 | 1.1-1.3 | >770 | 0.39 |
| DOP setting 3 | 0.2 | 0.10 | 0.09 | 0.06 | 5 | 1.1-1.3 | >770 | 0.44 |
| DOP setting 4 | 0.4 | 0.10 | 0.09 | 0.06 | 40 | 1.1-1.3 | >770 | 0.39 |

TABLE 5

Electrochemical and operational conditions of Leaching stage.
LEACHING STAGE (Leaching solution)

| Condition | $NO_3^-$ (M) | $H_2SO_4$ (M) | $Fe_{(t)}$ (M) | $H_2O_2$ (M) | pH | ORP (mV SHE) |
|---|---|---|---|---|---|---|
| DOP setting 1 | 0.13 | 0.15 | 0.09 | 0.06 | 1.1-1.3 | >770 |
| DOP setting 2 | 0.04 | 0.25 | 0.09 | 0.06 | 1.1-1.3 | >770 |
| DOP setting 3 | 0.13 | 0.15 | 0.09 | 0.06 | 1.1-1.3 | >770 |
| DOP setting 4 | 0.13 | 0.1 | 0.05 | 0.03 | 1.1-1.3 | >770 |

In FIG. 4, ores subjected to the dynamic oxidative process with different electrochemical regimes were able to surpass the passivation zone of copper recovery. Specifically, the copper recovery in DOP setting 1, 2 and 3 were similar around day 70, demonstrating that a range of nitrate concentration in the first and second reactive liquid mixture, as well as different volume ratio (or ratio of solution per ton of ore used) in these steps, and the application of a stronger oxidative boost with the dynamic boost stage, impacts the solubilization of the copper from chalcopyrite. The DOP setting 4 demonstrates that the presence of copper ions in the second reactive liquid mixture impacts the copper solubilization from chalcopyrite via metathesis effect.

Table 7 depicts water consumption using the DOP protocols compared to Leaching 1 and Leaching 2. Samples were prepared with the same ore type as in the above trials, consisting of primary sulfide ore (84-95% of copper as chalcopyrite) and to a lesser extent, secondary copper sulfide ore (up to 10% of the contained copper as covellite; and up to 10% of the contained copper as chalcocite/digenite). The crushed copper ore was first subjected to an activation treatment designed "Dynamic oxidative process (DOP)", consisting of an activating step followed by a rest period, a first irrigation with a first reactive mixture, a second irrigation with a second reactive mixture and finally a leaching step. The composition, pH and redox potential of each reactive mixture used in this example are shown in Table 6.

TABLE 6

Electrochemical and Operational Conditions

| | Activating step | DOP1 irrigation treatment | DOP2 irrigation treatment | Leaching step |
|---|---|---|---|---|
| Reagent used | Agglomeration solution | First reactive liquid mixture | Second reactive liquid mixture | Leaching solution |
| $NO_3^-$ | 1.5M | 0.14M | 0.40M | 0.15M |
| $H_2SO_4$ | 1.0M | 0.08M | 0.07M | 0.10M |
| $Fe_{total}$ | 0.03M | 0.05M | 0.08M | 0.05M |
| $H_2O_2$ | 0.02M | 0.03M | 0.06M | 0.04M |
| $Cu^{2+}$ | — | — | 0.04M | — |
| pH | <1 | 1.1-1.3 | 1.1-1.3 | 1.1-1.3 |
| ORP [mV SHE] | >770 | >770 | >770 | >770 |
| Irrigation rate | — | 1.5-2.9 $L/m^2 \cdot h$ | 1.5-2.5 $L/m^2 \cdot h$ | 5.0-5.6 $L/m^2 \cdot h$ |
| Ratio of solution per ton of ore used in each step | — | 0.30 $m^3$/ton | 0.40 $m^3$/ton | — |

The column labelled "Leaching 1" underwent agglomeration, a rest step of 5 days, followed by slow acid leaching (5-5.6 L/h/m$^2$), which is considered slow compared to the conventional irrigation rates for leaching which fluctuate between 8-12 L/h m$^2$). The agglomeration step for Leaching 1 was practiced using an agglomeration solution composed of 1.4 M H$_2$SO$_4$. 0.08 M Fe$_{total}$, a pH of less than 1, and an ORP of >770 mV vs SHE. This was followed by a leaching step with a leaching solution composed of 0.15 M of H$_2$SO$_4$, 0.1 M of Fe$_{total}$, a pH of 1.1-1.3, and ORP of >770 mV vs SHE.

The column labelled "Leaching 2" underwent agglomeration and a rest period of 5 days followed by a slow leaching stage. The agglomeration step was practiced using the agglomeration solution described in Table 1 and the composition of the solution for the leaching step is also described as in Table 1. Consequently, the nitrate concentration used in the agglomeration, resting and leaching steps is in the range of the Dynamic Oxidative Process. Leaching 2 lacks DOP1 and DOP2 treatments, which were only utilized in the aforementioned Dynamic Oxidative Process leaching column.

The referred DOP in Table 7 is capable of unlocking chalcopyrite with approximately 50% less water than a slow acid leach process (5 L/h m$^2$). Evaporation of water and absorption of the solution by the ore are the primary factors contributing to the water requirements in a heap leach operation.

TABLE 7

Water consumption during the DOP compared to the acid conventional leaching and nitrate leaching of sulfide ore

| Condition | Irrigation rate (L/h · m$^2$) | Water ratio: water-based solution m$^3$/per lbCu | Evaporation makeup; water m$^3$/lbCu | Absorbance of water on heap tailings- m$^3$/lbCu | Total water make-up heap - m$^3$/lbCu |
| --- | --- | --- | --- | --- | --- |
| DOP | 2 | 0.27 | 0.016 | 0.033 | 0.049 |
| Leaching 1 | 5 | 0.54 | 0.033 | 0.065 | 0.098 |
| Leaching 2 | 5 | 0.47 | 0.028 | 0.056 | 0.084 |

The calculation for evaporative make-up is based on an estimated 6% loss due to evaporation, which is based on the average annual water makeup requirements commonly used in the industry.

The calculation for water makeup on heap tailings, 12% of the absorbance of water on heap tailings, is based on an average water loss observed in the industry.

For comparison, the amount of water required to process copper sulfide ore through a conventional crush-grind-flotation-concentrate circuit can range from 1.5 up to 3 cubic meters (m$^3$) per ton of ore, or more, with an average of 0.4 m$^3$ of water per pound of copper (lb Cu). Results indicate that DOP significantly reduced the water required for extracting copper from copper sulfides.

Some components used in different embodiments of the invention, such as heating and/or process control systems, may include or may be coupled to appropriate power inputs which may be or may include in some examples a photovoltaic panel or a plurality of panels—although different power inputs and/or sources may be used in different embodiments. In some embodiments of the invention, the energy is delivered controlled to get the desired temperature for the electrochemical regimes.

Some embodiments of the invention may include process control units such as for example an Industrial Control System (ICS) or systems in different steps and/or protocols and procedure such as. e.g., described herein, which may include for example appropriate sensors (including, but not limited to, thermometers, pH sensors, Oxidation-Reduction Potential (ORP) sensors, ion-selective electrodes (ISEs), and flowmeters), transmission or communication paths or channels (which may be wireless or hard-wired) and actuators (which may include control valves and/or relays)—as known in the art.

Different embodiments are disclosed herein. Features of certain embodiments may be combined with features of other embodiments; thus, certain embodiments may be combinations of features of multiple embodiments. Likewise, in the following claims a feature expressed in a dependent claim may be combined with a different independent claim and/or with the features of other dependent claims. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes and equivalents will now occur to those of ordinary skill in the art. It is, therefore, to be understood that the appended claims are intended to cover all such modifications and changes as fall within the true spirit of the invention.

Unless explicitly stated, different process or method steps described herein with regard to different embodiments of the invention may not be constrained to a particular order or sequence. Additionally, some of the described method embodiments or elements thereof can occur or be performed simultaneously, at the same point in time, or concurrently.

The invention claimed is:

1. A method for recovering copper from copper ore, comprising:
    activating crushed copper ore with an agglomerating solution comprising nitrate ions, sulfuric acid, at least one of ferric ions and ferrous ions, and an oxidizing agent;
    forming a heap of the activated copper ore and allowing the heap to rest;
    irrigating the heap after resting at a flow rate of 0.5-5 L/h·m$^2$ with a first reactive liquid mixture comprising nitrate ions, sulfuric acid, an oxidizing agent and at least one of ferrous and ferric ions;

subsequent to irrigating with the first reactive liquid mixture, irrigating the heap at a flow rate of 0.5-5 L/h·m² with a second reactive liquid mixture comprising sulfuric acid, nitrate ion, at least one of ferrous and ferric ions, an oxidizing agent and a copper-containing solution, until a molar ratio of dissolved copper to chalcopyrite in the heap in a range of 0.3:1 to 0.6:1 is reached; and subjecting the heap to leaching with a leaching solution at a rate greater than 5 L/h·m² to obtain a copper-rich pregnant liquor solution (PLS).

2. The method according to claim 1, wherein the flow rate of irrigating the heap with the first and second reactive liquid mixtures is in a range of 1-3 L/h·m².

3. The method according to claim 1, wherein said copper ore contains primarily copper sulfide species.

4. The method according to claim 1, wherein said copper ore contains primarily chalcopyrite.

5. The method according to claim 1, wherein the oxidizing agent in the agglomerating solution and in the first and second reactive liquid mixtures is selected from the group consisting of aqueous hydrogen peroxide, gaseous ozone in micro and nano bubbles, gaseous oxygen in micro and nano bubbles, air in micro and nano bubbles, and a mixture thereof.

6. The method according to claim 1, wherein the agglomerating solution used in activating the crushed copper ore comprises: nitrate ion at a concentration in a range of 0.4 M to 3.2 M; sulfuric acid at a concentration in a range of 0.2 M to 3 M; at least one of ferrous and ferric ions at a concentration in a total amount of 0.03 M to 0.18 M and hydrogen peroxide at a concentration in a range of 0.02 to 0.06 M; and wherein an oxidation-reduction potential (ORP) of the agglomeration solution is higher than 770 mV vs. Standard Hydrogen Electrode (SHE).

7. The method according to claim 1, wherein after said activating, the crushed copper ore has a moisture content in a range of 3 to 12 percent by weight.

8. The method according to claim 1, wherein after forming the heap of the activated copper ore, the heap is allowed to rest without irrigation for 5 to 15 days.

9. The method according to claim 1, comprising irrigating the heap at a flow rate of 0.5-5 L/h·m² with the first reactive liquid mixture until a molar ratio of dissolved copper to chalcopyrite in the heap is reached between 0.1:1 to 0.3:1.

10. The method according to claim 1, wherein the first reactive liquid mixture comprises nitrate ion at a concentration in a range of 0.02 M to 0.4 M, sulfuric acid at a concentration in a range of 0.05 M to 1 M, at least one of ferrous and ferric ions at a concentration in a total amount of 0.02 M to 0.3 M, hydrogen peroxide at a concentration in a range of 0.03 M to 0.3 M; and a dissolved copper concentration less than 2 mM.

11. The method according to claim 1, wherein the second reactive liquid mixture comprises nitrate ion at a concentration in a range of 0.02 M to 0.4 M, sulfuric acid at a concentration in a range of 0.05 M to 1 M, at least one of ferrous and ferric ions at a concentration in a total amount of 0.02 M to 0.3 M, hydrogen peroxide in a range of 0.03 M to 0.3 M; and copper ions in a concentration of 2 mM to 100 mM.

12. The method according to claim 1, wherein the copper-containing solution comprises an aqueous stream obtained from the bottom of the heap after said irrigation with said first reactive liquid mixture.

13. The method according to claim 1, wherein the copper-containing solution further comprises an aqueous stream obtained from the bottom of the heap after said irrigation with said second reactive liquid mixture.

14. The method according to claim 1, wherein said leaching solution comprises nitrate ion, sulfuric acid, and at least one of ferric and ferrous ions.

15. The method according to claim 1, wherein the leaching solution comprises nitrate ion at a concentration in a range of 1 mM to 160 mM, sulfuric acid at a concentration in a range of 0.05 M to 1 M, and ferric and/or ferrous ions at a concentration in a range of 1 mM to 180 mM.

16. The method according to claim 15, wherein the leaching solution further comprises hydrogen peroxide at a concentration in a range of 0.01-0.3 M.

17. The method according to claim 16, wherein the leaching solution further comprises copper ions.

18. The method according to claim 16, wherein the PLS is subjected to solvent-extraction, and the leaching solution further comprises raffinate from the solvent extraction.

19. The method according to claim 1, wherein the leaching step is conducted at an irrigation rate of 5-12 L/h·m².

20. The method according to claim 1, wherein after forming the heap and prior to irrigating the heap with the first reactive liquid mixture, the heap is allowed to rest between 5 to 15 days, followed by irrigating the heap with a third reactive liquid mixture,
wherein in said third reactive liquid mixture the concentration of nitrate ion is in a range of 0.4 M to 3.2 M, the concentration of sulfuric acid is in a range of 0.2 M to 3 M, the concentration of ferric and ferrous ions in a total amount of 0.03 M to 0.18 M and said third reactive liquid mixture further comprises an oxidizing agent.

21. The method according to claim 20, wherein the oxidizing agent in the third reactive liquid mixture is selected from the group consisting of aqueous hydrogen peroxide, gaseous ozone in micro and nano bubbles, gaseous oxygen in micro and nano bubbles, air in micro and nano bubbles, and a mixture thereof.

22. The method according to claim 20, wherein irrigating the heap with the third reactive liquid mixture is conducted at an irrigation rate of 0.5-5 L/h·m².

23. The method according to claim 22, wherein irrigating the heap with a third reactive liquid mixture is conducted until reaching a volume ratio of about 0.05-0.15 m³ of said third reactive liquid mixture per ton of the copper ore.

24. The method according to claim 22, wherein in said third reactive liquid mixture the concentration of hydrogen peroxide is in a range of 3 mM to 150 mM.

25. The method according to claim 1, wherein the PLS is subjected to solvent extraction and electrowinning (SX/EW) process, and at least one of the agglomerating solution, the first reactive liquid mixture, the second reactive liquid mixture, the third reactive liquid mixture, and the leaching solution further comprises raffinate from the solvent extraction process.

26. The method according to claim 20, wherein the agglomerating solution, the first reactive liquid mixture, the second reactive liquid mixture and the third reactive liquid mixture each has a redox potential higher than 770 mV (vs SHE).

27. The method according to claim 22, wherein the heap irrigated with the first reactive liquid mixture, the second reactive liquid mixture and the third reactive liquid mixture, is maintained at a temperature in a range of about 30-45° C.

28. The method according to claim 1, comprising rinsing the heap after leaching to recover residual leaching solution.

29. The method according to claim 1, further comprising subjecting the PLS to solvent extraction to obtain a copper-rich electrolyte stream.

30. The method according to claim 29, further comprising subjecting the copper-rich electrolyte stream to electrowinning to obtain copper cathodes.

* * * * *